(12) United States Patent
Huang et al.

(10) Patent No.: US 11,916,714 B2
(45) Date of Patent: Feb. 27, 2024

(54) COMMUNICATION APPARATUS AND COMMUNICATION METHOD FOR CONTROL SIGNALING

(71) Applicant: Panasonic Intellectual Property Corporation of America, Torrance, CA (US)

(72) Inventors: Lei Huang, Singapore (SG); Yoshio Urabe, Nara (JP); Rojan Chitrakar, Singapore (SG)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 17/788,667

(22) PCT Filed: Oct. 30, 2020

(86) PCT No.: PCT/SG2020/050624
§ 371 (c)(1),
(2) Date: Jun. 23, 2022

(87) PCT Pub. No.: WO2021/141530
PCT Pub. Date: Jul. 15, 2021

(65) Prior Publication Data
US 2023/0035527 A1 Feb. 2, 2023

(30) Foreign Application Priority Data
Jan. 9, 2020 (SG) ............................ 10202000228Q

(51) Int. Cl.
*H04L 27/26* (2006.01)
*H04L 5/00* (2006.01)

(52) U.S. Cl.
CPC ........ *H04L 27/2613* (2013.01); *H04L 5/0048* (2013.01)

(58) Field of Classification Search
CPC ........................... H04L 27/2603; H04W 84/12
See application file for complete search history.

(56) References Cited

U.S. PATENT DOCUMENTS

2020/0136884 A1* 4/2020 Park ................... H04L 27/2665

OTHER PUBLICATIONS

Au, "Specification Framework for TGbe," IEEE P802.11 Wireless LANs, 19/1262r6, Huawei, Nov. 27, 2019, 12 pages.
Cao et al., "EHT Preamble Design," IEEE 802.11-19/1540r7, Marvell, Nov. 11, 2019, 20 pages.
International Search Report, dated Feb. 2, 2021, for International Application No. PCT/SG2020/050624, 3 pages.
Liu et al., "Joint Sounding for Multi-AP Systems," IEEE 802.11-19/1593r0, Mediatek, Sep. 12, 2019, 17 pages.
Redlich et al., "Improved Preamble Puncturing in 802.11be," IEEE 802.11-19/1190r03, Huawei, Nov. 6, 2019, 11 pages.

* cited by examiner

*Primary Examiner* — Kevin Kim
(74) *Attorney, Agent, or Firm* — Seed IP Law Group LLP

(57) ABSTRACT

The present disclosure provides communication apparatus and communication method for control signaling. The communication apparatus comprises circuitry, which, in operation, generates a transmission signal comprising a first signal field which comprises a first part and a second part, each comprising an equal number of data bits, wherein the data bits of the second part of the first signal field does not comprise version independent bits; and a transmitter, which, in operation, transmit the generated transmission signal.

13 Claims, 31 Drawing Sheets

| CBW (MHz) | L | |
|---|---|---|
| | 1 | 2 |
| 20 | 1 | N.A. |
| 40 | 2 | 1 |
| 80 | 2 | 2 |
| 80+80, 160 | 2 | 2 |
| 160+160, 320 | 2 | 2 |

L = 1        L = 2

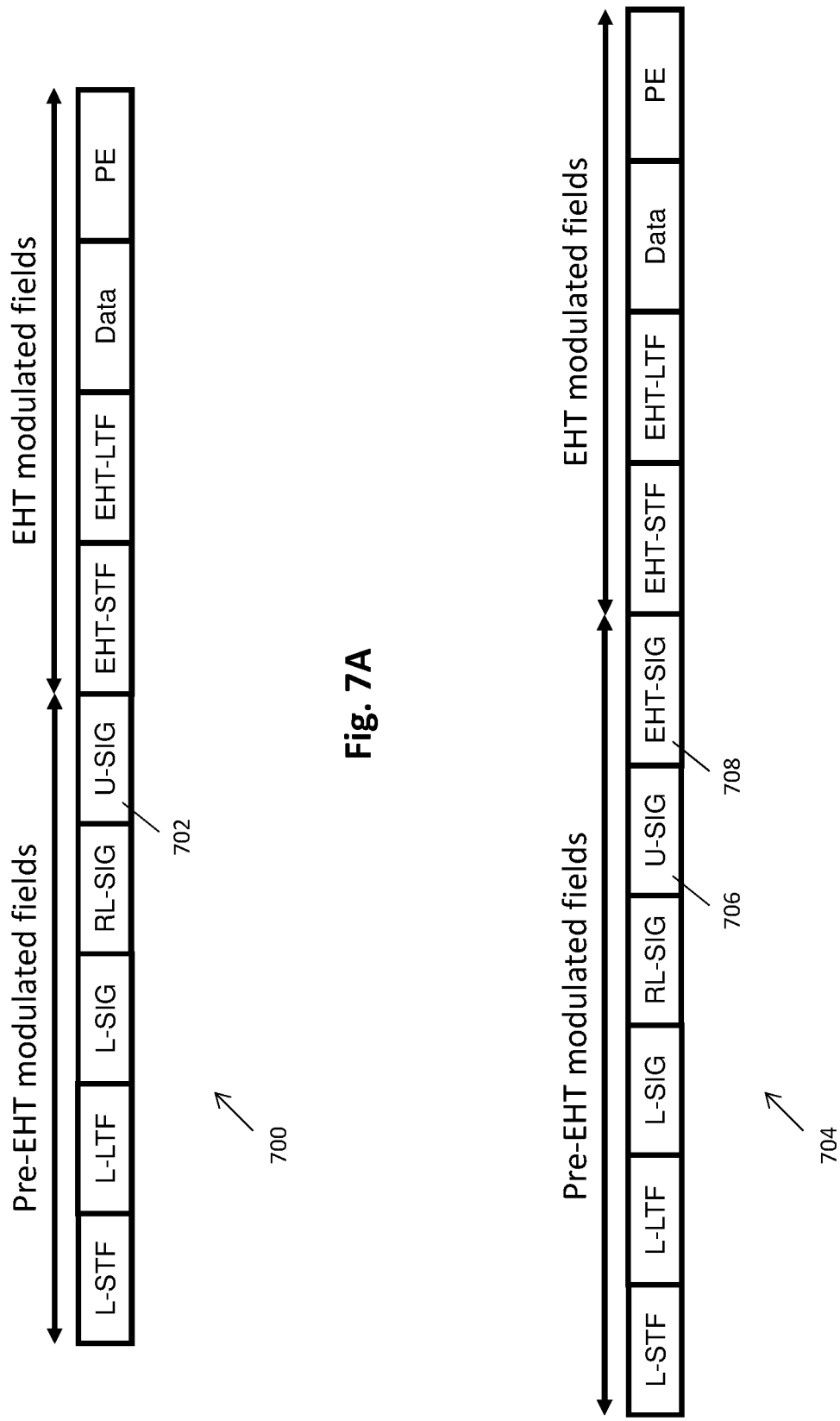

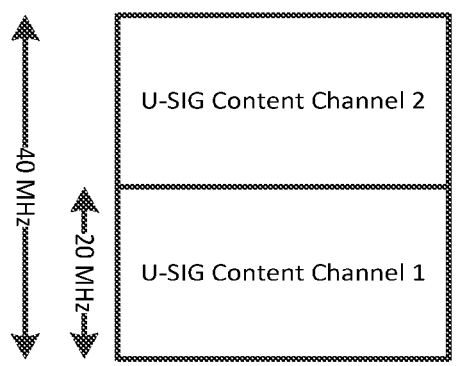
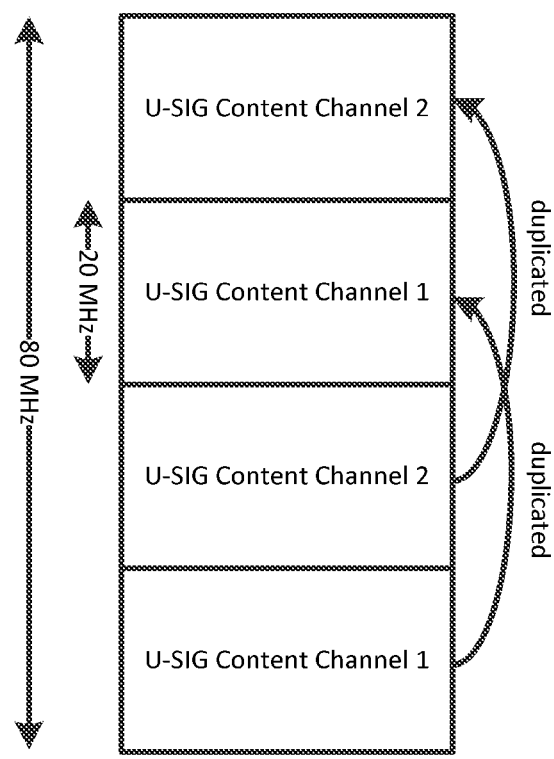
Fig. 7C
Fig. 7D

COMMUNICATION APPARATUS AND COMMUNICATION METHOD FOR CONTROL SIGNALING

TECHNICAL FIELD

The present disclosure relates to communication apparatuses and methods for control signaling, and more particularly to communication apparatuses and methods for control signaling in EHT WLAN (extremely high throughput wireless local area network).

BACKGROUND

In the standardization of next generation wireless local area network (WLAN), a new radio access technology having backward compatibilities with IEEE 802.11a/b/g/n/ac/ax technologies has been discussed in the IEEE 802.11 Working Group and is named Extremely High Throughput (EHT) WLAN.

In EHT WLAN, in order to provide significant peak throughput and capacity increase beyond 802.11ax high efficiency (HE) WLAN, it is desired to increase the maximum channel bandwidth from 160 MHz to 320 MHz, increase the maximum number of spatial streams from 8 to 16 and to support multi-band operation. Further, in order to improve spectral efficiency over 11ax HE WLAN, it has been proposed to allow preamble puncturing for a physical layer protocol data unit (PPDU) transmitted to a single communication apparatus.

However, there has been no discussion on communication apparatuses and methods for control signaling, specifically on efficient signaling support for preamble puncturing for a PPDU transmitted to a single communication apparatus in the context of EHT WLAN.

There is thus a need for communication apparatuses and methods that provide feasible technical solutions for control signaling in the context of EHT WLAN. Furthermore, other desirable features and characteristics will become apparent from the subsequent detailed description and the appended claims, taken in conjunction with the accompanying drawings and this background of the disclosure.

SUMMARY

Non-limiting and exemplary embodiments facilitate providing communication apparatuses and communication methods for control signaling in context of EHT WLAN.

According to an embodiment of the present disclosure, there is provided a communication apparatus comprising circuitry, which, in operation, generates a transmission signal comprising a first signal field which comprises a first part and a second part, each comprising an equal number of data bits; and a transmitter, which, in operation, transmit the generated transmission signal, wherein the data bits of the second part of the first signal field do not comprise version independent bits.

According to another embodiment of the present disclosure, there is provided a communication apparatus comprising: a receiver, which, in operation, receives a transmission signal comprising a first signal which comprises a first part and a second part, each comprising an equal number of data bits; and circuitry, which, in operation, processes the received transmission signal, wherein the data bits of the second part of the first signal field do not comprise version independent bits.

According to yet another embodiment of the present disclosure, there is provided a communication method comprising: generating a transmission signal comprising a first signal field which comprises a first part and a second part, each containing an equal number of data bits; and transmitting the generated transmission signal, wherein the second part of the first signal field do not contain version independent bits.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

Embodiments of the disclosure will be better understood and readily apparent to one of ordinary skilled in the art from the following written description, by way of example only, and in conjunction with the drawings, in which:

FIG. 7A depicts an example format of an EHT SU PPDU.

FIG. 7B depicts an example format of an EHT MU PPDU.

FIG. 7C shows a diagram of mapping of two U-SIG content channels in a 40 MHz EHT SU or MU PPDU.

FIG. 7D shows a diagram of mapping of two U-SIG content channels in an 80 MHz EHT SU or MU PPDU.

Figure 1A:
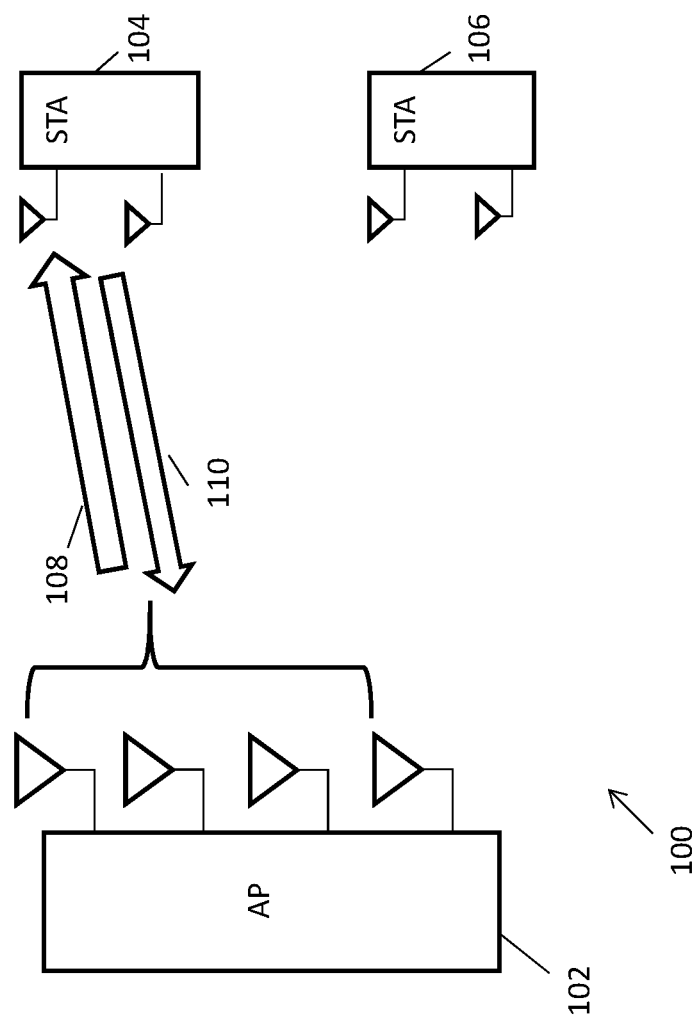
FIG. 1A depicts a schematic diagram of uplink and downlink single-user (SU) multiple input multiple output (MIMO) communications between an access point (AP) and a station (STA) in a MIMO wireless network.

Skilled artisans will appreciate that elements in the figures are illustrated for simplicity and clarity and have not necessarily been depicted to scale. For example, the dimensions of some of the elements in the illustrations, block diagrams or flowcharts may be exaggerated in respect to other elements to help an accurate understanding of the present embodiments.

DETAILED DESCRIPTION

Some embodiments of the present disclosure will be described, by way of example only, with reference to the drawings. Like reference numerals and characters in the drawings refer to like elements or equivalents.

In the following paragraphs, certain exemplifying embodiments are explained with reference to an access point (AP) and a station (STA) for uplink or downlink control signaling, especially in a multiple-input multiple-output (MIMO) wireless network.

In the context of IEEE 802.11 (Wi-Fi) technologies, a station, which is interchangeably referred to as a STA, is a communication apparatus that has the capability to use the 802.11 protocol. Based on the IEEE 802.11-2016 definition, a STA can be any device that contains an IEEE 802.11-conformant media access control (MAC) and physical layer (PHY) interface to the wireless medium (WM).

For example, a STA may be a laptop, a desktop personal computer (PC), a personal digital assistant (PDA), an access point or a Wi-Fi phone in a wireless local area network (WLAN) environment. The STA may be fixed or mobile. In the WLAN environment, the terms "STA", "wireless client", "user", "user device", and "node" are often used interchangeably.

Likewise, an AP, which may be interchangeably referred to as a wireless access point (WAP) in the context of IEEE 802.11 (Wi-Fi) technologies, is a communication apparatus that allows STAs in a WLAN to connect to a wired network. The AP usually connects to a router (via a wired network) as a standalone device, but it can also be integrated with or employed in the router.

As mentioned above, a STA in a WLAN may work as an AP at a different occasion, and vice versa. This is because communication apparatuses in the context of IEEE 802.11 (Wi-Fi) technologies may include both STA hardware components and AP hardware components. In this manner, the communication apparatuses may switch between a STA mode and an AP mode, based on actual WLAN conditions and/or requirements.

In a MIMO wireless network, "multiple" refers to multiple antennas used simultaneously for transmission and multiple antennas used simultaneously for reception, over a radio channel. In this regard, "multiple-input" refers to multiple transmitter antennas, which input a radio signal into the channel, and "multiple-output" refers to multiple receiver antennas, which receive the radio signal from the channel and into the receiver. For example, in an N×M MIMO network system, N is the number of transmitter antennas, M is the number of receiver antennas, and N may or may not be equal to M. For the sake of simplicity, the respective numbers of transmitter antennas and receiver antennas are not discussed further in the present disclosure.

In a MIMO wireless network, single-user (SU) communications and multi-user (MU) communications can be deployed for communications between communication apparatuses such as APs and STAs. MIMO wireless network has benefits like spatial multiplexing and spatial diversity, which enable higher data rates and robustness through the use of multiple spatial streams. According to various embodiments, the term "spatial stream" may be used interchangeably with the term "space-time stream" (or STS).

FIG. 1A depicts a schematic diagram of SU-MIMO communications 100 between an AP 102 and a STA 104 in a MIMO wireless network. As shown, the MIMO wireless network may include one or more STAs (e.g. STA 104, STA 106, etc.). In the SU-MIMO communications 100, the AP 102 transmits multiple space-time streams using multiple antennas (e.g. four antennas as shown in FIG. 1A) with all the space-time streams directed to a single communication apparatus, i.e. the STA 104. For the sake of simplicity, the multiple space-time streams directed to the STA 104 are illustrated as a grouped data transmission arrow 108 directed to the STA 104.

The SU-MIMO communications 100 can be configured for bi-directional transmissions. As shown in FIG. 1A, in the SU-MIMO communications 100, the STA 104 may transmit multiple space-time streams using multiple antennas (e.g. two antennas as shown in FIG. 1A) with all the space-time streams directed to the AP 102. For the sake of simplicity, the multiple space-time streams directed to the AP 102 are illustrated as a grouped data transmission arrow 110 directed to the AP 102.

As such, the SU-MIMO communications 100 depicted in FIG. 1A enables both uplink and downlink SU transmissions in a MIMO wireless network.

Figure 1B:
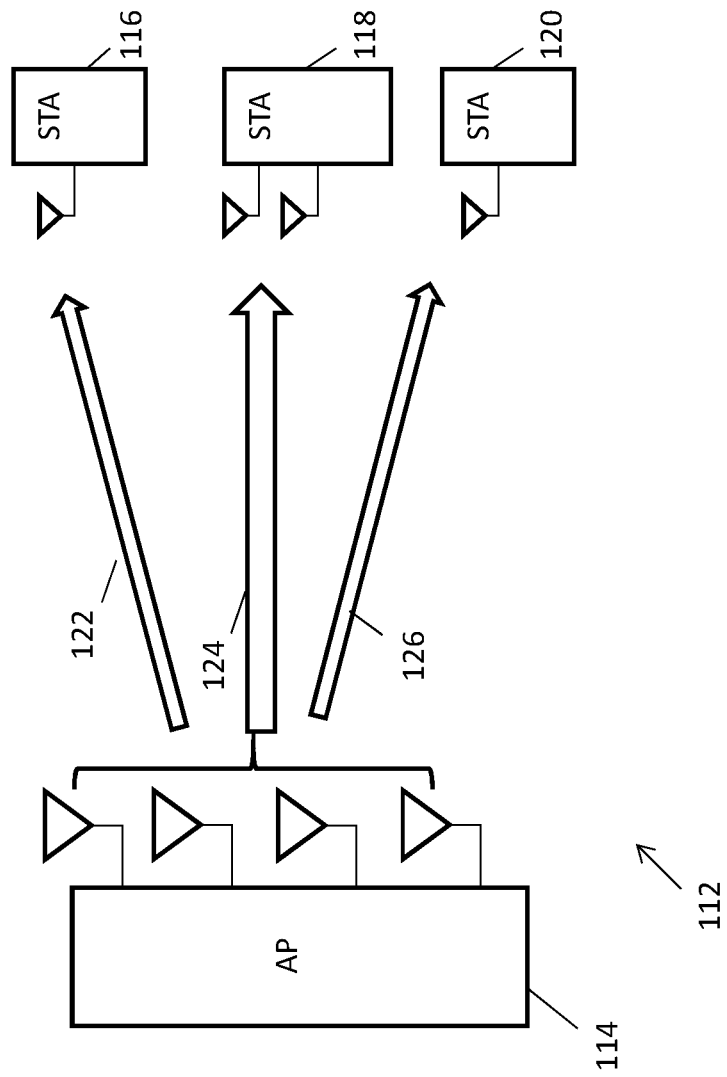
FIG. 1B depicts a schematic diagram of downlink multi-user communications between an AP and multiple STAs in a MIMO wireless network.

FIG. 1B depicts a schematic diagram of downlink MU communications 112 between an AP 114 and multiple STAs 116, 118, 120 in a MIMO wireless network. The MIMO wireless network may include one or more STAs (e.g. STA 116, STA 118, STA 120, etc.). In the downlink MU communications 112, the AP 114 transmits multiple streams simultaneously to the STAs 116, 118, 120 in the network using multiple antennas via spatial mapping or precoding techniques at same resource units (RUs) and/or different RUs. For example, two space-time streams may be directed to the STA 118, another space-time stream may be directed to the STA 116, and yet another space-time stream may be directed to the STA 120. For the sake of simplicity, the two space-time streams directed to the STA 118 are illustrated as a grouped data transmission arrow 124, the space-time stream directed to the STA 116 is illustrated as a data transmission arrow 122, and the space-time stream directed to the STA 120 is illustrated as a data transmission arrow 126.

To enable uplink MU transmissions, trigger-based communications is provided to the MIMO wireless network. In this regard, FIG. 1C depicts a schematic diagram of trigger-based uplink MU communications 128 between an AP 130 and multiple STAs 132, 134, 136 in a MIMO wireless network.

Since there are multiple STAs 132, 134, 136 participating in the trigger-based uplink MU communications, the AP 130 needs to coordinate simultaneous transmissions of multiple STAs 132, 134, 136.

Figure 1C:
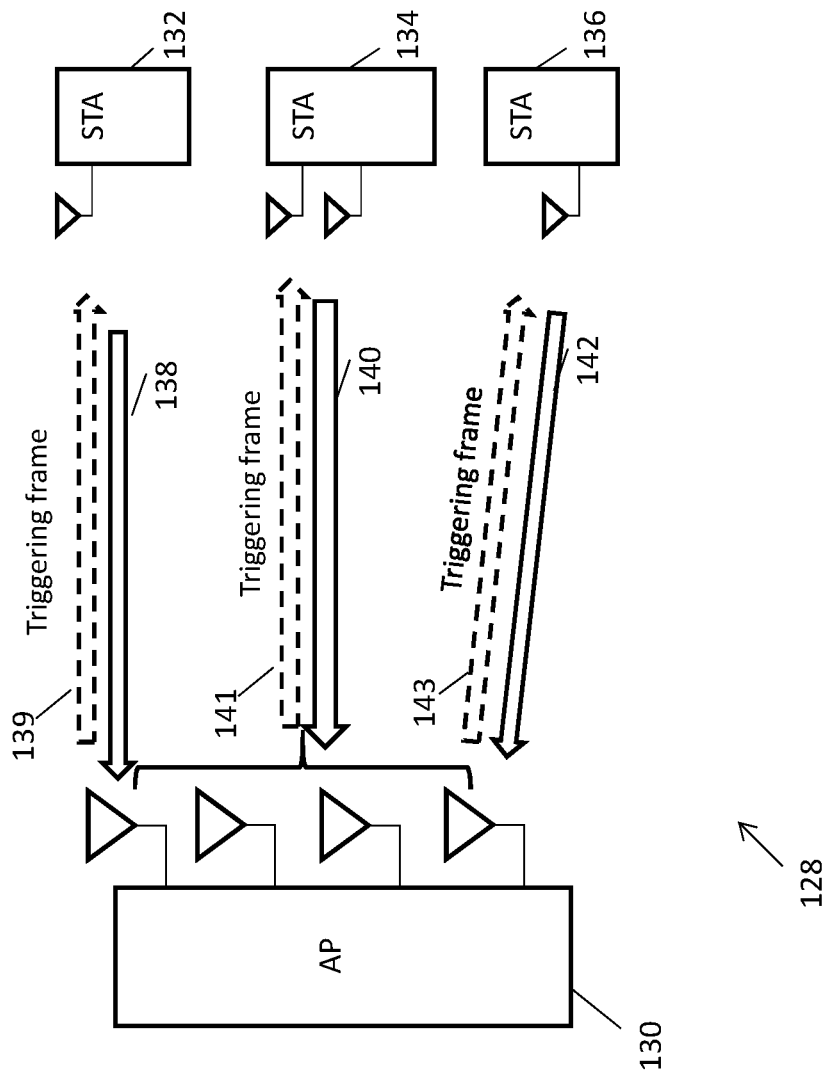
FIG. 1C depicts a schematic diagram of trigger-based uplink MU communications between an AP and multiple STAs in a MIMO wireless network.

To do so, as shown in FIG. 1C, the AP 130 transmits triggering frames 139, 141, 143 simultaneously to STAs 132, 134, 136 to indicate user-specific resource allocation information (e.g. the number of space-time streams, a starting STS number and the allocated RUs) each STA can use. In response to the triggering frames, STAs 132, 134, 136 may then transmit their respective space-time streams simultaneously to the AP 130 according to the user-specific resource allocation information indicated in the triggering frames 139, 141, 143. For example, two space-time streams may be directed to the AP 130 from STA 134, another space-time stream may be directed to the AP 130 from STA 132, and yet another space-time stream may be directed to the AP 130 from STA 136. For the sake of simplicity, the two space-time streams directed to the AP 130 from STA 134 are illustrated as a grouped data transmission arrow 140, the space-time stream directed to the AP 130 from STA 132 is illustrated as a data transmission arrow 138, and the space-time stream directed to the AP 130 from STA 136 is illustrated as a data transmission arrow 142.

Trigger-based communications is also provided to the MIMO wireless network to enable downlink multi-AP communications. In this regard, FIG. 1D depicts a schematic diagram of downlink multi-AP communications 144, between a STA 150 and multiple APs 146, 148 in a MIMO wireless network.

Since there are multiple APs 146, 148 participating in the trigger-based downlink multi-AP MIMO communications, the master AP 146 needs to coordinate simultaneous transmissions of multiple APs 146, 148.

Figure 1D:
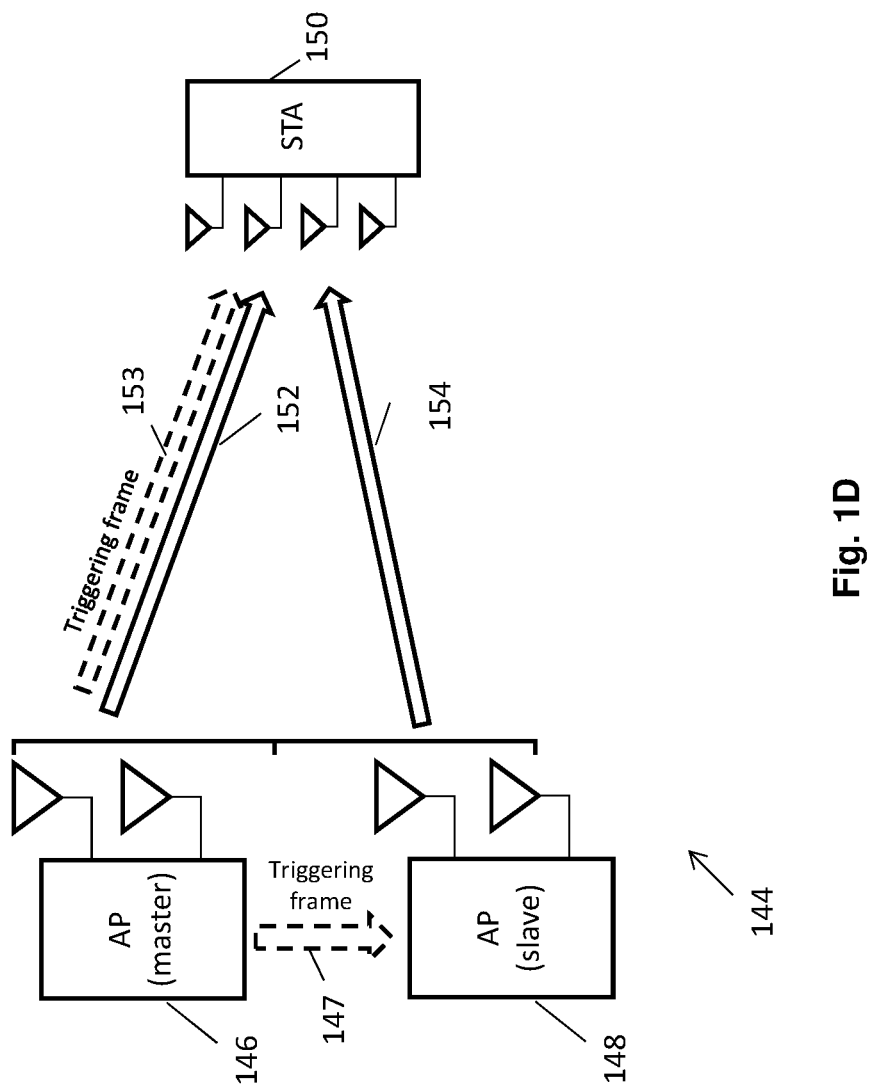
FIG. 1D depicts a schematic diagram of trigger-based downlink multi-AP MIMO communications between multiple APs and a STA in a MIMO wireless network.

To do so, as shown in FIG. 1D, the master AP 146 transmits triggering frames 147, 153 simultaneously to the AP 148 and the STA 150 to indicate AP-specific resource allocation information (e.g. the number of space-time streams, a starting STS stream number and the allocated RUs) each AP can use. In response to the triggering frames, the multiple APs 146, 148 may then transmit respective space-time streams to the STA 150 according to the AP-specific resource allocation information indicated in the triggering frame 147; and the STA 150 may then receive all the space-time streams according to the AP-specific resource allocation information indicated in the triggering frame 153. For example, two space-time streams may be directed to the STA 150 from AP 146, and another two space-time streams may be directed to the STA 150 from AP 148. For the sake of simplicity, the two space-time streams directed to the STA 150 from AP 146 are illustrated as a grouped data transmission arrow 152, and the two space-time streams directed to the STA 150 from the AP 148 is illustrated as a grouped data transmission arrow 154.

Due to packet/PPDU (physical layer protocol data unit) based transmission and distributed MAC (medium access control) scheme in 802.11 WLAN, time scheduling (e.g. TDMA (time division multiple access)-like periodic time slot assignment for data transmission) does not exist in 802.11 WLAN. Frequency and spatial resource scheduling is performed on a packet basis. In other words, resource allocation information is on a PPDU basis.

Figure 2A:
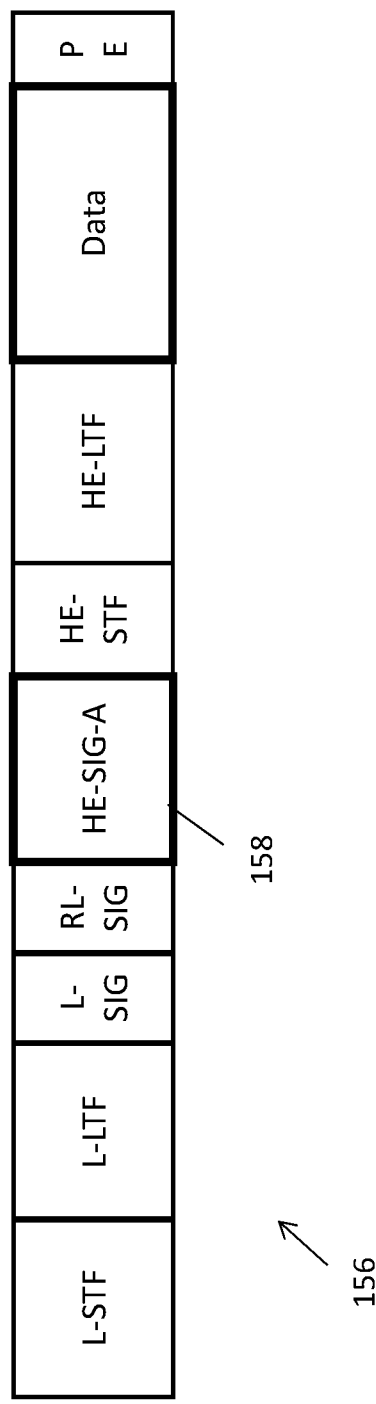
FIG. 2A depicts an example format of a PPDU (physical layer protocol data unit) used for uplink and downlink SU communications between an AP and a STA in an HE WLAN.

FIG. 2A depicts an example format of a PPDU 156 used for single-user communications between an AP and a STA in a HE WLAN. Such a PPDU 156 is referred to as an HE SU PPDU 156. The HE SU PPDU 156 may include a non-High Throughput Short Training Field (L-STF), a non-High Throughput Long Training Field (L-LTF), a non-High Throughput SIGNAL (L-SIG) field, a Repeated L-SIG (RL-SIG) field, a HE SIGNAL A (HE-SIG-A) field 158, a HE Short Training Field (HE-STF), a HE Long Training Field (HE-LTF), a Data field 170 and a Packet Extension (PE) field. The RL-SIG field is mainly used for identifying the format of an HE PPDU. The HE-SIG-A field 158 contains the necessary control information for decoding the Data field, such as uplink/downlink, modulation and coding scheme (MCS) and bandwidth (BW).

Figure 2B:
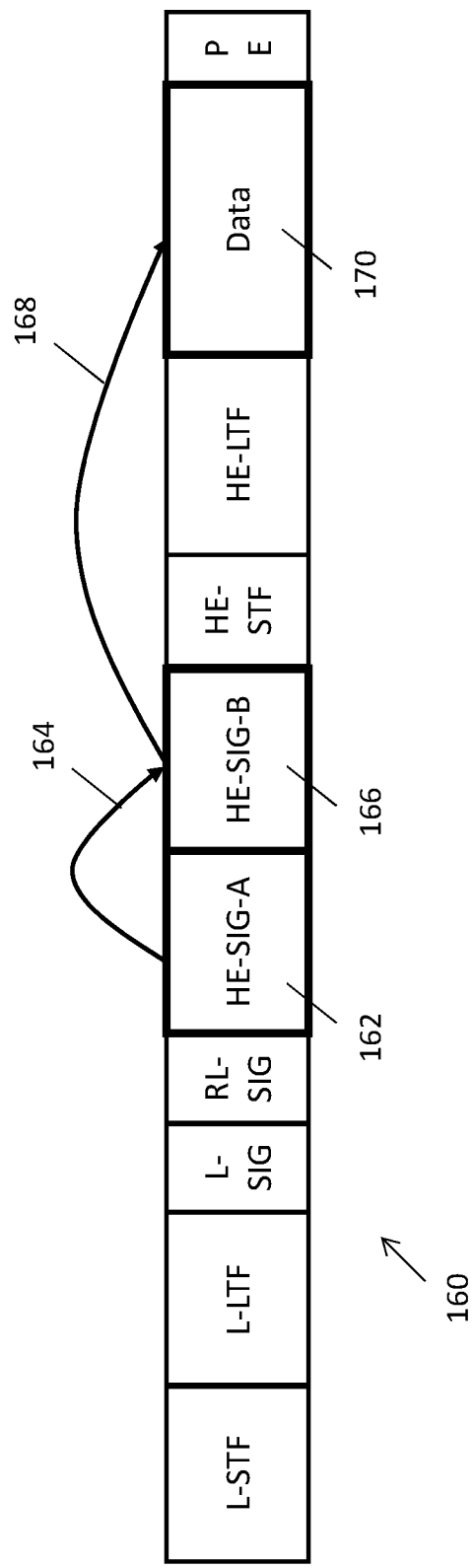
FIG. 2B depicts an example format of a PPDU used for downlink multi-user (MU) communications between an AP and multiples STAs in an HE WLAN.

FIG. 2B shows an example format of a PPDU 160 used for downlink MU communications between an AP and multiple STAs in a HE WLAN, e.g. OFDMA (Orthogonal Frequency Division Multiple Access) transmission including MU-MIMO transmission in a single RU (resource unit) and full-bandwidth MU-MIMO transmission. Such a PPDU 160 is referred to as an HE MU PPDU 160. A HE MU PPDU may have a similar format as HE SU PPDU but include a HE SIGNAL B (HE-SIG-B) field 166. In particular, the HE MU PPDU 160 may include a L-STF, L-LTF, L-SIG, R-SIG, HE-SIG-A field 162, HE-SIG-B field 166, a HE-STF, a HE-LTF, a Data field 170 and a PE field. In the HE MU PPDU 160, the HE-SIG-B field 166 provides the OFDMA and MU-MIMO resource allocation information to allow STAs to look up the corresponding resources to be used in the Data field 170, like indicated by an arrow 168. The HE-SIG-A field 162 contains the necessary information for decoding the HE-SIG-B field 166, e.g. MCS for HE-SIG-B, number of HE-SIG-B symbols, like indicated by an arrow 164.

Figure 2C:
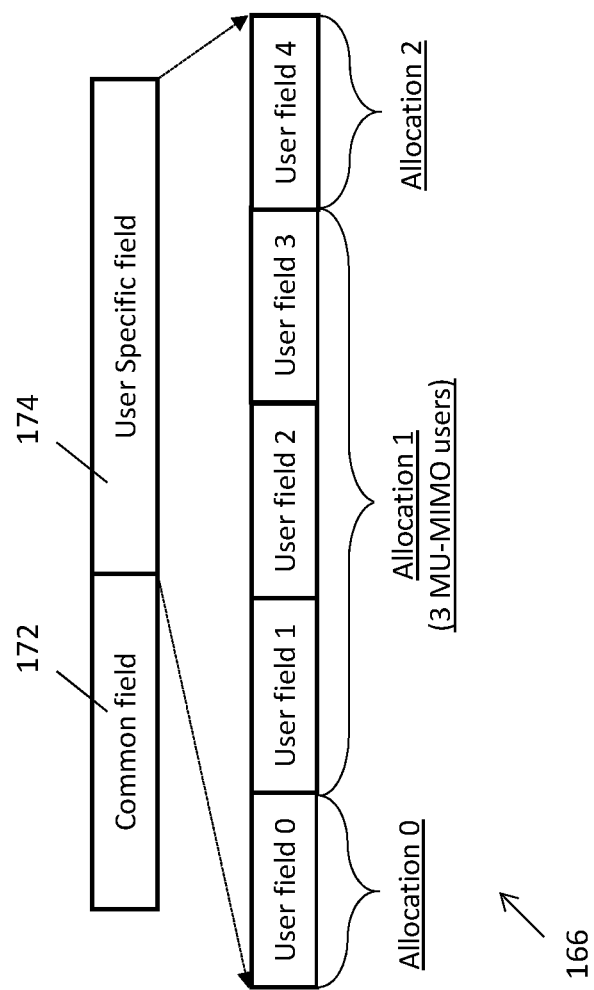
FIG. 2C depicts the HE-SIG-B field in more details.

FIG. 2C depicts the HE-SIG-B field 166 in more detail. The HE-SIG-B field 166 includes (or consists of) a Common field 172, if present, followed by a User Specific field 174 which together are referred to as the HE-SIG-B content channel. The HE-SIG-B field 166 contains a RU Allocation subfield which indicates the RU information for each of the allocations. The RU information includes a RU position in the frequency domain, an indication of the RU allocated for a non-MU-MIMO or MU-MIMO allocation, and the number of users in the MU-MIMO allocation. The Common field 172 is not present in the case of a full-bandwidth MU-MIMO transmission. In this case, the RU information (e.g. the number of users in the MU-MIMO allocation) is signalled in the HE-SIG-A field 162.

The User Specific field 174 includes (or consists of) one or more User field(s) for non-MU-MIMO allocation(s) and/or MU-MIMO allocation(s). A User field contains user information indicating a user-specific allocation (i.e. user-specific allocation information). In the example shown in FIG. 1F, the User Specific field 174 includes five user fields (User field 0, . . . , User field 4), wherein user-specific allocation information for an allocation (Allocation 0) is provided by User field 0, user-specific allocation information for a further allocation (Allocation 1 with 3 MU-MIMO users) is provided by User field 1, User field 2, and User field 3, and user-specific allocation information for yet a further allocation (Allocation 2) is provided by User field 4.

Figure 2D:
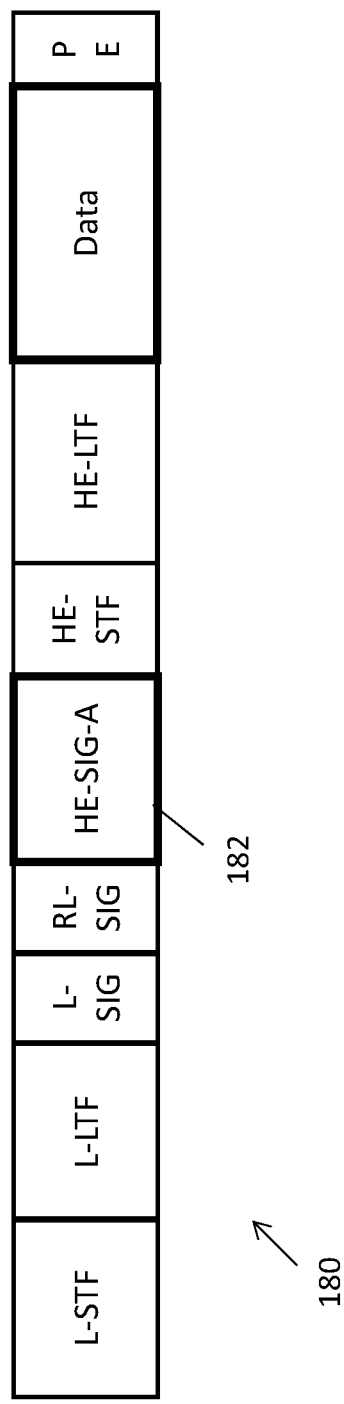
FIG. 2D depicts an example format of a PPDU used for trigger-based uplink MU communications between an AP and multiple STAs in an HE WLAN.

FIG. 2D shows a format of a PPDU 180 used for uplink MU communications between an AP and multiple STAs in a HE WLAN. Such a PPDU 180 is referred to as an HE TB (trigger-based) PPDU 180. A HE TB PPDU may have a similar format as HE SU PPDU. In particular, the HE TB PPDU 180 may include a L-STF, a L-LTF, a L-SIG field, a RL-SIG field, a HE-SIG-A field 182, a HE-STF, a HE-LTF, a Data field and a PE field. The HE-STF of HE TB PPDU 180 has a duration of 8 µs. The HE TB PPDU 180 is used for uplink MU transmission that is in response to a triggering frame. Instead of using the HE-SIG-B field, the information required for the uplink MU transmission from one or more STAs is carried by the triggering frame that solicits this transmission. In a typical transmission of the HE TB PPDU 180, HE-SIG-A related information is copied from the soliciting triggering frame into the HE-SIG-A field 182 of the HE TB PPDU 180.

In 11ax HE WLAN, only preamble puncturing for a PPDU transmitted to multiple STAs is allowed. With the increase in the maximum channel bandwidth from 160 MHz to 320 MHz and the increase in the maximum number of spatial streams from 8 to 16, it is an object of present disclosure to substantially overcome the existing challenges to provide communication apparatuses and methods for control signaling that allow preamble puncturing for a PPDU transmitted to a single STA in order to improve spectral efficiency of EHT WLAN over 11ax HE WLAN.

According to various embodiments, EHT WLAN supports non-trigger-based communications as illustrated in FIG. 1A and FIG. 1B and trigger-based communications as illustrated in FIG. 1C and FIG. 1D. In non-trigger-based communications, a communication apparatus transmits a PPDU to one other communication apparatus or more than one other communication apparatuses in an unsolicited manner. In trigger-based communications, a communication apparatus transmits a PPDU to one other communication apparatus or more than one other communication apparatuses only after a soliciting triggering frame is received.

Figure 3A:
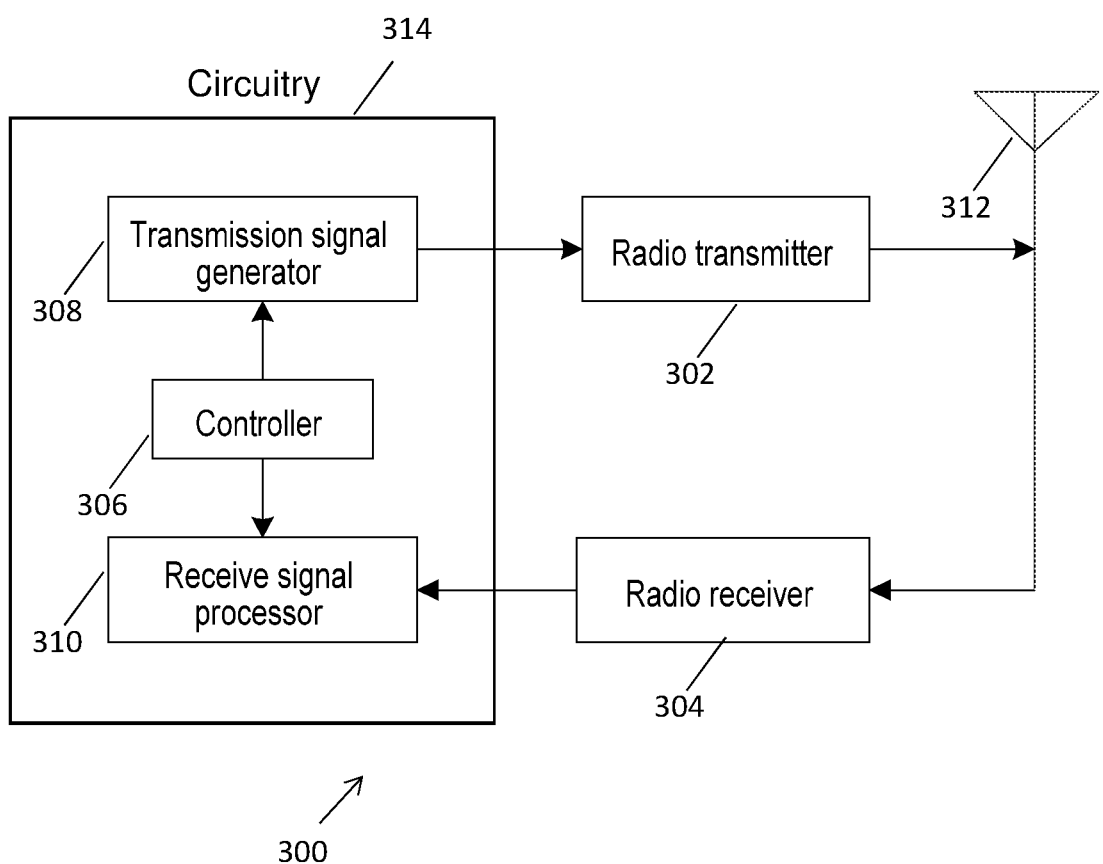
FIG. 3A shows a schematic example of communication apparatus in accordance with various embodiments. The communication apparatus may be implemented as an AP or an STA and configured for control signaling in accordance with various embodiments of the present disclosure.

FIG. 3A shows a schematic, partially sectioned view of a communication apparatus 300 according to various embodiments. The communication apparatus 300 may be implemented as an AP or an STA according to various embodiments.

As shown in FIG. 3A, the communication apparatus 300 may include circuitry 314, at least one radio transmitter 302, at least one radio receiver 304, and at least one antenna 312 (for the sake of simplicity, only one antenna is depicted in FIG. 3A for illustration purposes). The circuitry 314 may include at least one controller 306 for use in software and hardware aided execution of tasks that the at least one controller 306 is designed to perform, including control of communications with one or more other communication apparatuses in a MIMO wireless network. The circuitry 314 may furthermore include at least one transmission signal generator 308 and at least one receive signal processor 310. The at least one controller 306 may control the at least one transmission signal generator 308 for generating PPDUs (for example PPDUs used for non-trigger-based communications or PPDUs used for trigger-based multi-AP joint transmission if the communication apparatus 300 is an AP, and for example PPDUs used for non-trigger-based communications or PPDUs used for trigger-based uplink transmissions if the communication apparatus 300 is a STA) to be sent through the at least one radio transmitter 302 to one or more other communication apparatuses and the at least one receive signal processor 310 for processing PPDUs (for example PPDUs used for non-trigger-based communications or PPDUs used for trigger-based uplink transmissions if the communication apparatus 300 is an AP, and for example PPDUs used for non-trigger-based communications or PPDUs used for trigger-based multi-AP joint transmission if the communication apparatus 300 is a STA) received through the at least one radio receiver 304 from the one or more other communication apparatuses under the control of the at least one controller 306. The at least one transmission signal generator 308 and the at least one receive signal processor 310 may be stand-alone modules of the communication apparatus 300 that communicate with the at least one controller 306 for the above-mentioned functions, as shown in FIG. 3A. Alternatively, the at least one transmission signal generator 308 and the at least one receive signal processor 310 may be included in the at least one controller 306. It is appreciable to those skilled in the art that the arrangement of these functional modules is flexible and may vary depending on the practical needs and/or requirements. The data processing, storage and other relevant control apparatus can be provided on an appropriate circuit board and/or in chipsets. In various embodiments, when in operation, the at least one radio transmitter 302, at least one radio receiver 304, and at least one antenna 312 may be controlled by the at least one controller 306.

The communication apparatus 300, when in operation, provides functions required for control signaling in non-trigger-based communications and trigger-based communications. For example, the communication apparatus 300 may be an AP, and the circuitry 314 (for example the at least one transmission signal generator 308 of the circuitry 314) may, in operation, generate a transmission signal (for example a PPDU used for non-trigger-based communications or a PPDU used for trigger-based multi-AP joint transmission) comprising a first signal field which comprises a first part and a second part, each comprising an equal number of data bits, wherein the data bits of the second part of the first signal field do not comprise version independent bits. The radio transmitter 302 may in operation, transmit the generated transmission signal to one or more other communication apparatuses.

The communication apparatus 300 may be a STA, and the radio receiver 304 may, in operation, receive a transmission signal (for example an PPDU used for non-trigger-based communications or a PPDU used for trigger-based multi-AP joint transmission) from one other communication apparatus (for example an AP) comprising a first signal field which comprises a first part and a second part, each comprising an equal number of data bits, wherein the data bits of the second part of the first signal field do not comprise version independent bits. The circuitry 314 (for example the at least one receive signal processor 310 of the circuitry 314) may, in operation, process the received transmission signal.

Figure 3B:
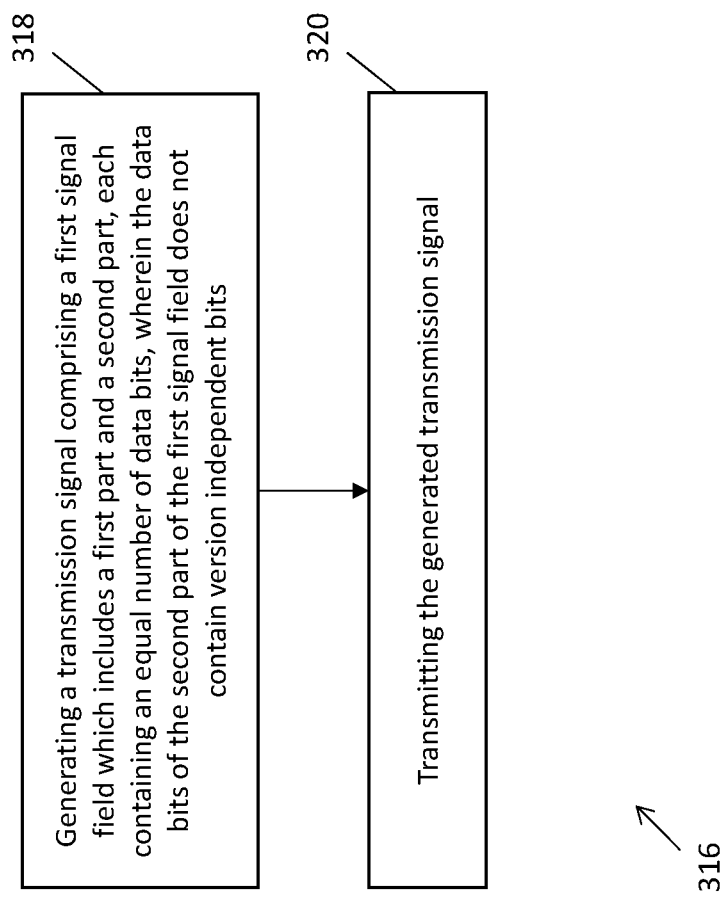
FIG. 3B shows a flow diagram illustrating a communication method according to various embodiments.

FIG. 3B shows a flow diagram 316 illustrating a communication method for transmitting control signaling according to various embodiments. In step 318, a transmission signal is generated, the transmission comprising a first signal field which comprises a first part and a second part, each comprising an equal number of data bits, wherein the data bits of the second part of the first signal field do not contain version independent bits. In step 320, the generated transmission signal is transmitted to one or more other communication apparatuses.

In an embodiment, the first signal field of the transmission signal has a single format in non-trigger-based communications with one or more other communication apparatuses (such as STAs). In another embodiment, the transmission signal comprises a second signal field which comprises part of version dependent bits in non-trigger-based communications. In such embodiment, the second signal field has a format when the transmission signal is transmitted to one other communication apparatus and another format when the transmission signal is transmitted to more than one other communication apparatuses. In an embodiment, the second signal field may comprise a preamble puncturing bitmap when the transmission signal is transmitted to one other communication apparatus. In yet another embodiment, the first signal field comprises information for interpreting the second signal field. This may allow preamble puncturing for a PPDU transmitted to a single communication apparatus and may advantageously enable efficient signaling support and improve spectral efficiency of EHT WLAN over 11ax HE WLAN.

In the following paragraphs, certain exemplifying embodiments are explained with reference to an AP and multiple STAs for control signaling to enable preamble puncturing for a PPDU transmitted to a single communication apparatus in non-trigger-based communications.

Figure 4A:
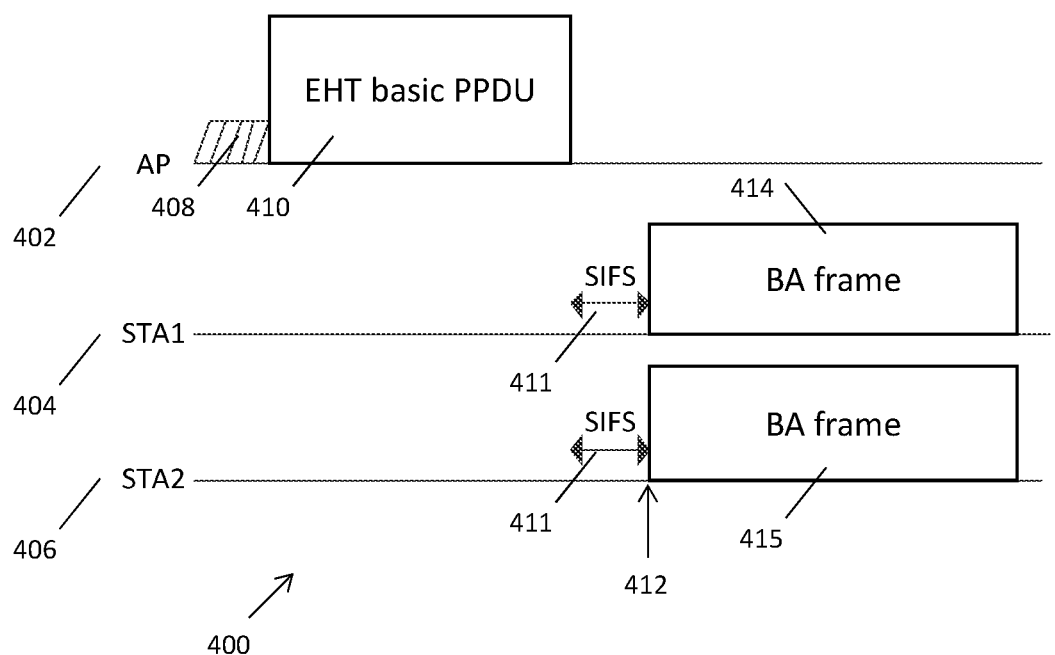
FIG. 4A depicts a flow chart illustrating a downlink communication according to an embodiment.

FIG. 4A depicts a flow chart 400 illustrating a downlink communication according to an embodiment, where the downlink communication is between an AP 402 and a single communication apparatus 404 or between an AP 402 and multiple communication apparatuses like STAs 404, 406. Contention based channel access procedures, e.g. enhanced distributed channel access (EDCA) procedures, is illustrated by block 408, and short interframe spacing (SIFS) 411 is illustrated. The AP 402 may generate a transmission signal (for example an EHT basic PPDU) 410 comprising a first signal field which comprises a first part and a second part, each comprising an equal number of data bits, wherein the data bits of the second part of the first signal field do not comprise version independent bits. The first signal field of the transmission signal 410 may have a single format regardless of whether the transmission signal 410 is transmitted to STA 404 or STAs 404, 406. In an embodiment, the transmission signal 410 may comprise a second signal field which comprises part of version dependent bits. When communicating with multiple or more than one communication apparatuses like STAs 404, 406, the second signal field of the transmission signal 410 may comprise another format that is different from that of transmission signal 410 transmitted to a single communication apparatus like STA 404. In an embodiment, the second signal field may comprise a preamble puncturing bitmap when the transmission signal 410 is transmitted to STA 404. In yet another embodiment, the first signal field comprises information for interpreting the second signal field. The ratio transmitter of AP 402 may transmit the generated transmission signal 410 to STA 404 or STAs 404, 406.

In IEEE 802.11 networks, a SIFS is the time spacing prior to transmission of an acknowledgement by a STA. After the last symbol of the transmission signal 410 is transmitted, a SIF 411 may take effect, and at 412, the radio transmitters of STAs 404, 406 may simultaneously transmit their respective block acknowledgement (BA) frames 414, 415 when the transmission signal 410 is transmitted to STAs 404, 406; or the radio transmitter of STA 404 may transmit its own BA frame 414 when the transmission signal 410 is transmitted to STA 404.

Figure 5A:
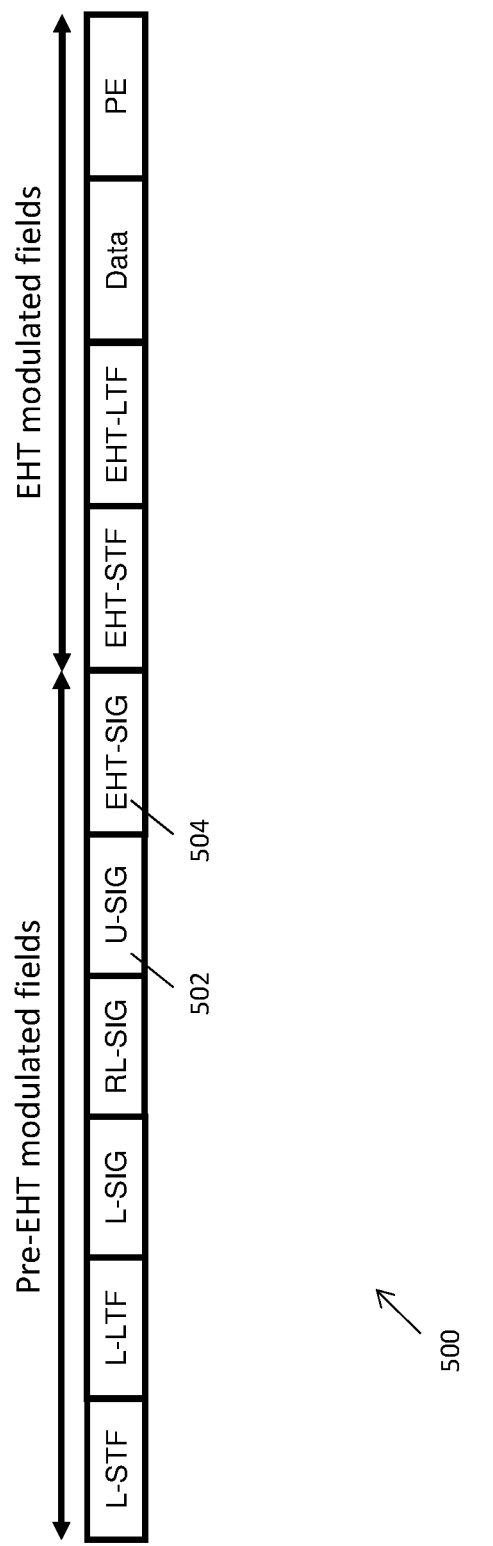
FIG. 5A depicts an example format of an EHT basic PPDU for non-trigger-based communications.

According to the present disclosure, an EHT basic PPDU can be used for non-trigger-based SU or MU communications. FIG. 5A depicts an example format of an EHT basic PPDU 500. The EHT basic PDDU 500 comprises a L-STF, L-LTF, L-SIG field, RL-SIG field, a universal signal (U-SIG) field 502, an EHT signal (EHT-SIG) field 504, an EHT-STF, an EHT-LTF, a Data field and a PE field. The L-STF, the L-LTF, the L-SIG field, the RL-SIG field, the U-SIG field and the EHT-SIG field may be grouped as pre-EHT modulated fields, while the EHT-STF, the EHT-LTF, the Data field and the PE field may be grouped as EHT modulated fields. Both U-SIG field 502 and EHT-SIG field 504 are present in the EHT basic PPDU transmitted to a single STA or multiple STAs.

Figure 5B:
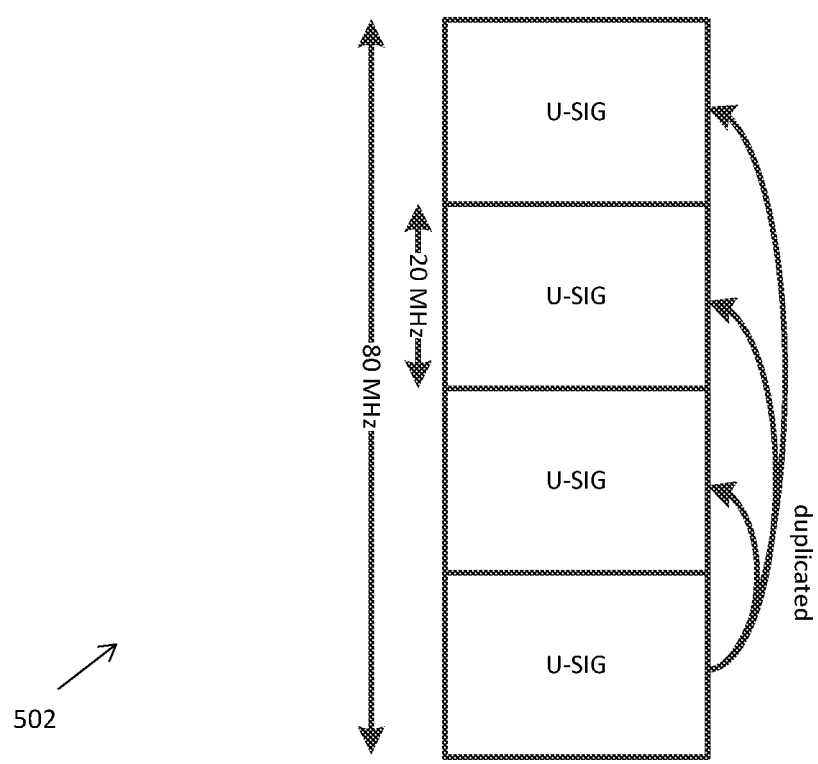
FIG. 5B depicts the U-SIG field in more details.

According to various embodiments, the U-SIG field 502 has a duration of two orthogonal frequency-division multiplexing (OFDM) symbols. Data bits in the U-SIG field 502 are jointly encoded and modulated in the same manner as the HE-SIG-A field of 802.11ax. Modulated data bits in the U-SIG field 502 are mapped to 52 data tones of each of the two OFDM symbols and duplicated for each 20 MHz frequency segment in the same manner as the HE-SIG-A field of 802.11ax. An example of transmission of the U-SIG field 502, where the bandwidth of EHT basic PPDU 500 is 80 MHz, is illustrated in FIG. 5B.

In various embodiments, the U-SIG field 502 has a same format regardless of whether the EHT basic PPDU 500 is transmitted to a single STA or multiple STAs. The U-SIG field 502 comprises two parts: U-SIG1 and U-SIG2, each comprising 26 data bits. The U-SIG field 502 comprises all version independent bits and a part of version dependent bits. All version independent bits are included in U-SIG1 and have static location and bit definition across different physical layer (PHY) versions, the version independent bits comprising PHY version identifier (3 bits), uplink/downlink (UL/DL) flag (1 bit), basic service set (BSS) color (e.g. 6 bits) and transmission opportunity (TXOP) duration (e.g. 7 bits). The PHY version identifier of the version independent bits is used to identify the exact PHY version starting with 802.11be. The effect of including all version-independent bits into one part of the U-SIG field 502, i.e. U-SIG1, is that the legacy STAs only require to parse the U-SIG1 and thus their power efficiency can be improved. On the other hand, version dependent bits may have variable bit definition in each PHY version. The part of version dependent bits included in the U-SIG field 502 may comprise PPDU format, SU/MU flag and BW as well as EHT-SIG related bits which are used for interpreting EHT-SIG field 504, and spatial reuse related bits which are used for coexisting with unintended STAs.

An example format of U-SIG field 502 is illustrated in table 1. As mentioned above, the U-SIG field 502 comprises two parts: U-SIG1 and U-SIG2, each of the two parts containing 26 data bits. The U-SIG1 comprises a PHY Version Identifier field, an UL/DL Flag field, a BSS Color field, a TXOP Duration field, a PPDU Format field, a SU/MU Flag field and a BW field; whereas the U-SIG2 comprises an EHT-SIG Compression field, an EHT-SIG EHT MCS field, an EHT-SIG Dual sub-Carrier Modulation (DCM) field, a Number Of EHT-SIG Symbols Or MU-MIMO Users field, and a Spatial Reuse field, followed by reserved bits, a Cyclic Redundancy Check (CRC) field for detecting error and tail bits. Unless specified otherwise in this specification, it should be appreciable and apparent to one of ordinary skilled in the art that the standard definitions, protocols and functions of most of the fields in the U-SIG field 502 listed in table 1 can be obtained from the 802.11ax specification.

According to the present disclosure, when the PHY Version Identifier field refers to 802.11be, the PPDU Format field is set to "0" for EHT basic PPDU and "1" for EHT TB PPDU. When the PPDU Format field is set to "0" referring to an EHT basic PPDU, the SU/MU Flag field is set to "0" for EHT basic PPDU transmitted to a single STA, and "1" for EHT basic PPDU transmitted to multiple STAs. A preamble puncturing mode is only allowed when a PPDU has a bandwidth of 80 MHz or higher. On this basis, the BW field is set to "0" for 20 MHz, "1" for 40 MHz, "2" for 80 MHz non-preamble puncturing mode, "3" for 160 MHz and 80+80 MHz non-preamble puncturing mode, "4" for 320 MHz and 160+160 MHz non-preamble puncturing mode, "5" for 80 MHz preamble puncturing mode, "6" for 160 MHz and 80+80 MHz preamble puncturing mode, "7" for 320 MHz and 160+160 MHz preamble puncturing mode.

TABLE 1

An example format of U-SIG field of EHT basic PPDU

| | Field name | Field size (bits) |
|---|---|---|
| U-SIG1 | PHY Version Identifier | 3 |
| | UL/DL Flag | 1 |
| | BSS Color | 6 |
| | TXOP Duration | 7 |
| | Reserved | 4 |
| | PPDU Format | 1 |
| | SU/MU Flag | 1 |
| | BW | 3 |
| U-SIG2 | EHT-SIG Compression | 1 |
| | EHT-SIG EHT MCS | 3 |
| | EHT-SIG DCM | 1 |
| | Number Of EHT-SIG Symbols Or MU-MIMO Users | 4 |
| | Spatial Reuse | 4 |
| | Reserved | 3 |
| | CRC | 4 |
| | Tail | 6 |
| | Total | 52 |

Returning to FIG. 5A, the EHT-SIG field 504 of the EHT basic PPDU 500 may include remaining version dependent bits. It has a variable MCS and variable length. The EHT-SIG field 504 has a Common field followed by a User Specific field which together are referred to as an EHT-SIG content channel. Unlike U-SIG field 502, the format of EHT-SIG field 504 depends on whether the EHT basic PPDU 500 is transmitted to a single STA or multiple STAs. The differences of the EHT-SIG formats between the transmissions to a single STA and the transmissions to multiple STAs will be described in the following.

Figure 5C:
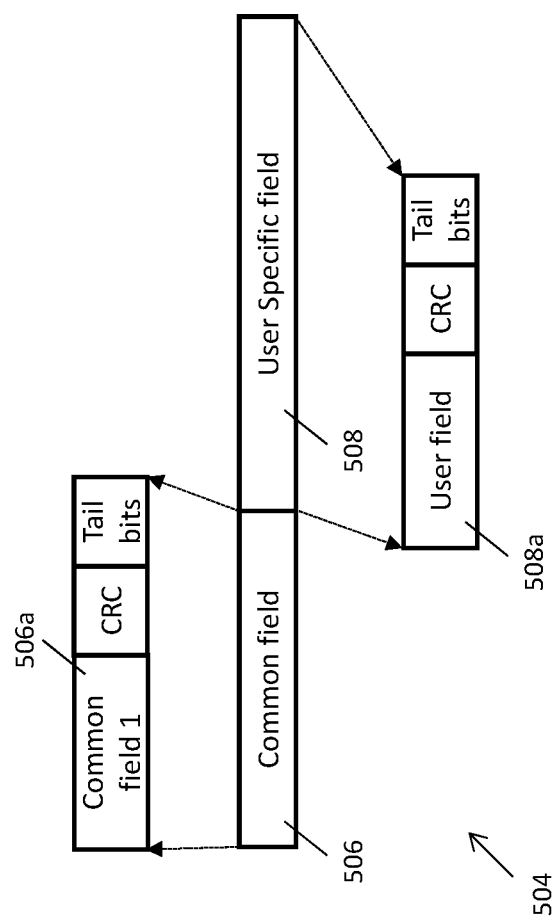
FIGS. 5C and 5D depicts two examples of the EHT-SIG field when an EHT basic PPDU is transmitted to a single STA.

When EHT basic PPDU is transmitted to a single STA, the Common field of the EHT-SIG field 504 comprises a single Common field 1 and the User Specific field comprises a single User field. Further, there will be a single EHT-SIG content channel regardless of the BW of EHT basic PPDU, which is duplicated for each 20 MHz frequency segment. The Common field and the User Specific field can be separately encoded or jointly encoded, resulting in two different EHT-SIG field format options. FIG. 5C depicts an example format of EHT-SIG field 504 in an event of an EHT basic PPDU transmitted to a single STA where the Common field 506 and the User Specific field 508 are separately encoded (Option 1). The Common field 506 comprises a single Common field 1 506a and the User Specific field 508 comprises a single User field 508a. The Common field 506 and the User Specific field 508 are separately encoded. As a result, each of the Common field 1 506a of the Common field 506 and the User field 508a of the User Specific field 508 is appended with a CRC field and tail bits, as illustrated in FIG. 5C.

Figure 5D:
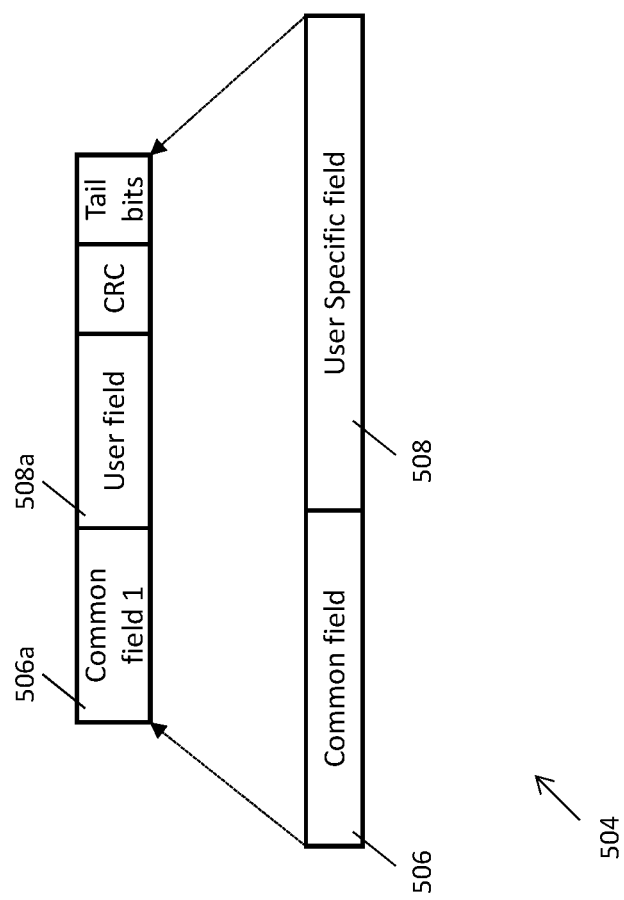

FIG. 5D depict another example format of EHT-SIG field 504 in an event of an EHT basic PPDU transmitted to a single STA where the Common field 506 and the User Specific field 508 are jointly encoded (Option 2). In this embodiment, the EHT-SIG field 504 comprises a single Common field 1 506a of the Common field 506 followed by a single User field 508a of the User Specific field 508 to which a CRC field and tails bits are appended. Such jointly encoded EHT-SIG field format may advantageously reduce the number of CRC fields and tail bits used in EHT-SIG field, thus reduce signaling overhead.

Example formats of Common field 1 506a and the User field 508a when the EHT basic PPDU 500 is transmitted to a single STA are illustrated in tables 13 and 2, respectively. The Common field 1 506a may comprise a Low Density Parity Check (LDPC) Extra Symbol Segment subfield, a Pre-FEC Padding Factor subfield, a PE Disambiguity subfield, a Space-Time Block Coding (STBC) subfield, a Doppler subfield, a GI-LTF Size subfield, an EHT-LTF Mode subfield, a Beam Change subfield and a Preamble Puncturing Bitmap subfield. The User field 508a may have a field size of 22 bits, comprising a STA Identifier (ID) field, an EHT MCS field, a DCM field, a Number Of Space-Time Streams (NSTS) And Midamble Periodicity field, a Coding field and a Beamformed field. The STA ID is included in the User field such that an unintended STA may discard the remaining EHT basic PPDU 500, thus improve its power efficiency. Unless specified otherwise in this specification, it should be appreciable and apparent to one of ordinary skilled in the art that the standard definitions, protocols and functions of most of the fields of the Common field 1 506a and the User field 508a listed in tables 13 and 2 can be obtained from the 802.11ax specification.

TABLE 2

An example format of User field when the EHT basic PPDU is transmitted to a single STA

| Subfield name | Field size (bits) |
|---|---|
| STA ID | 11 |
| EHT MCS | 4 |
| DCM | 1 |
| NSTS And Midamble Periodicity | 4 |

TABLE 2-continued

An example format of User field when the EHT basic PPDU is transmitted to a single STA

| Subfield name | Field size (bits) |
| --- | --- |
| Coding | 1 |
| Beamformed | 1 |
| Total | 22 |

According to the present disclosure, the Preamble Puncturing Bitmap field is present in Common field 506 of EHT-SIG field 504 when EHT basic PPDU 500 is transmitted to a single STA and the BW field of U-SIG field 502 is set to "4", "5", "6" and "7", referring to a 80 MHz, 160 (or 80+80) MHz or 320 (or 160+160) MHz preamble puncturing mode respectively. The Preamble Puncturing Bitmap field has a variable bit width depending on the bandwidth of the EHT basic PPDU 500.

There may have two options for the Preamble Puncturing Bitmap field. In option 1, the Preamble Puncturing Bitmap field has 3, 7, or 15 bits when the BW field refers to an 80 MHz, a 160 (or 80+80) MHz, or a 320 (or 160+160) MHz preamble puncturing mode, respectively. Each bit indicates if a 20 MHz frequency segment which is not the primary 20 MHz is punctured. In option 2, the Preamble Puncturing Bitmap field has 3, 7 or 7 bits when the BW field refers to an 80 MHz, a 160 (or 80+80) MHz, or a 320 (or 160+160) MHz preamble puncturing mode, respectively. In particular, when the BW field refers to 80 MHz or 160 (or 80+80) MHz preamble puncturing mode, each bit indicates if a 20 MHz frequency segment which is not the primary 20 MHz is punctured; and when the BW field refers to 320 or 160+160 MHz preamble puncturing mode, each bit indicates if a 40 MHz frequency segment which is not the primary 40 MHz is punctured. The effect of indicating a 40 MHz frequency segment rather than a 20 MHz in 320 or 160+160 MHz preamble puncturing mode is a tradeoff between signaling overhead and spectral efficiency. The above features may advantageously allow preamble puncturing for a PPDU transmitted to a single STA using an EHT basic PPDU 500.

Moreover, the EHT-LTF Mode field of the Common field 1 506a is set to "0" to indicate subcarrier interleaved EHT-LTF symbols are not used, and "1" to indicate subcarrier interleaved EHT-LTF symbols may be used. An example of subcarrier interleaved EHT-LTF symbols can be found in IEEE 802.11-19/1593r0. Such subcarrier interleaved EHT-LTF symbols may be used to maintain the number of EHT-LTF symbols especially when the number of space-time streams is more than 8.

According to various embodiments, the format of EHT-SIG field when the EHT basic PPDU 500 is transmitted to multiple STAs is different from the format of EHT-SIG field transmitted to single STA. In an event of an EHT basic PPDU 500 transmitted to multiple STAs, the Common field of the EHT-SIG field 504 comprises two components, namely Common field 1 and Common field 2, and the User Specific field comprises one or more User field, which together are referred to as an EHT-SIG content channel. Further, there is one or two EHT-SIG content channels depending on the bandwidth of the EHT basic PPDU. Specifically, the EHT-SIG field 504 comprising the Common field 510 and the User Specific field 512 are separately encoded on each L×20 MHz frequency segment, where L=1 or 2.

Figures 5E, 5F:
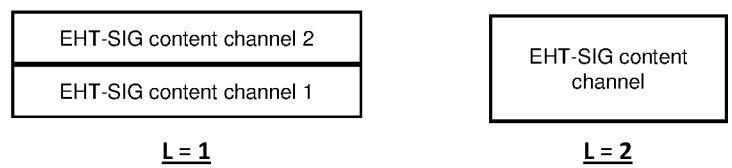
FIG. 5E shows a table of how the number of EHT-SIG content channels depends on the bandwidth and the value of L according to various embodiments.
FIG. 5F shows a diagram of mapping of one or two EHT-SIG content channels when a 40 MHz EHT basic PPDU is transmitted to multiple STAs.

FIG. 5E shows a table of how the number of EHT-SIG content channels depends on the bandwidth and the value of L according to various embodiments. As shown in FIG. 5E, in the event that the bandwidth is 20 MHz, L can only be 1 because the EHT-SIG field is encoded on a per-20 MHz basis and there will be only one EHT-SIG content channel. In the embodiment where the bandwidth is 40 MHz, L may be assigned by the AP the value of 1 or 2. If L is set to "1", there will be two EHT-SIG content channels. If L is set to "2", there will be only one EHT-SIG content channel. In the embodiment where the bandwidth is 80 MHz, 80+80 MHz, 160 MHz, 160+160 MHz or 320 MHz, there will be two EHT-SIG content channels regardless of the value of L. More details will be provided below.

FIG. 5F shows a diagram of mapping of the one or two EHT-SIG content channels in a 40 MHz EHT basic PPDU. The number of EHT-SIG content channels depends on the bandwidth and the value of L as shown in FIG. 5E. A 40 MHz channel comprises two 20 MHz frequency segments. When L=1, there will be two EHT-SIG content channels (namely, EHT-SIG content channel 1 and EHT-SIG content channel 2) which are transmitted in the $1^{st}$ and $2^{nd}$ 20 MHz frequency segments, respectively. When L=2, there will be only one EHT-SIG content channel.

Figure 5G:
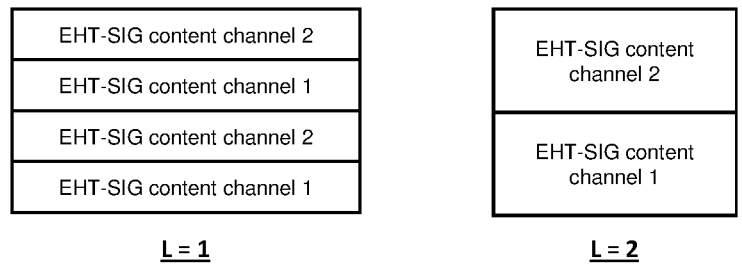
FIG. 5G shows a diagram of mapping of two EHT-SIG content channels when an 80 MHz EHT basic PPDU is transmitted to multiple STAs.

FIG. 5G shows a diagram of mapping of the two EHT-SIG content channels (namely EHT-SIG content channel 1 and EHT-SIG content channel 2) in an 80 MHz EHT basic PPDU. When L=1, in an 80 MHz channel comprising four 20 MHz frequency segments, EHT-SIG content channel 1 is duplicated and transmitted in the $1^{st}$ and $3^{rd}$ 20 MHz frequency segments while EHT-SIG content channel 2 is duplicated and transmitted in the $2^{nd}$ and $4^{th}$ 20 MHz frequency segments. When L=2, in an 80 MHz channel comprising two 40 MHz frequency segments, EHT-SIG content channel 1 is transmitted in the $1^{st}$ 40 MHz frequency segment while EHT-SIG content channel 2 is transmitted in the $2^{nd}$ 40 MHz frequency segment.

Figure 5H:
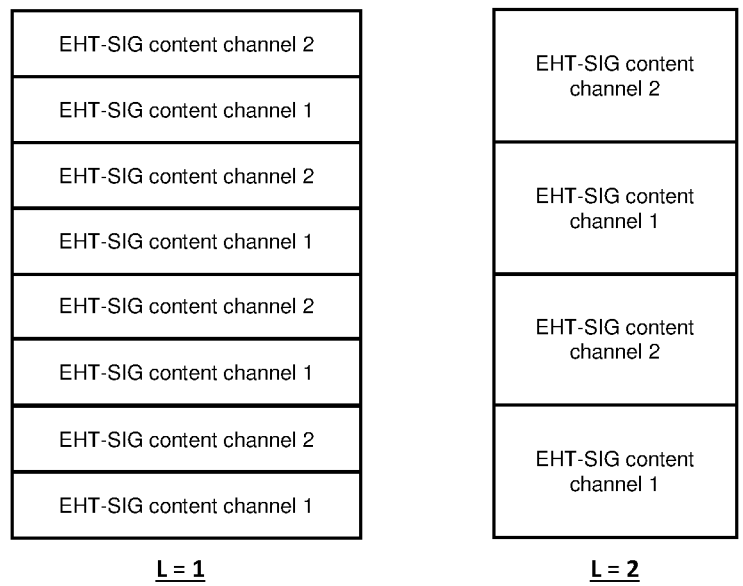
FIG. 5H shows a diagram of mapping of two EHT-SIG content channels in an 80+80 MHz or 160 MHz EHT basic PPDU is transmitted to multiple STAs.

FIG. 5H shows a diagram of mapping of the two EHT-SIG content channels in an 80+80 MHz or 160 MHz EHT basic PPDU. When L=1, in an 80+80 MHz or 160 MHz channel comprising eight 20 MHz frequency segments, EHT-SIG content channel 1 is duplicated and transmitted in the $1^{st}$, $3^{rd}$, $5^{th}$ and $7^{th}$ 20 MHz frequency segments while EHT-SIG content channel 2 is duplicated and transmitted in the $2^{nd}$, $4^{th}$, $6^{th}$ and $8^{th}$ 20 MHz frequency segments. When L=2, in an 80+80 MHz or 160 MHz channel comprising four 40 MHz frequency segments, EHT-SIG content channel 1 is duplicated and transmitted in the $1^{st}$ and $3^{rd}$ 40 MHz frequency segments while EHT-SIG content channel 2 is duplicated and transmitted in the $2^{nd}$ and $4^{th}$ 40 MHz frequency segments.

Figure 5I:
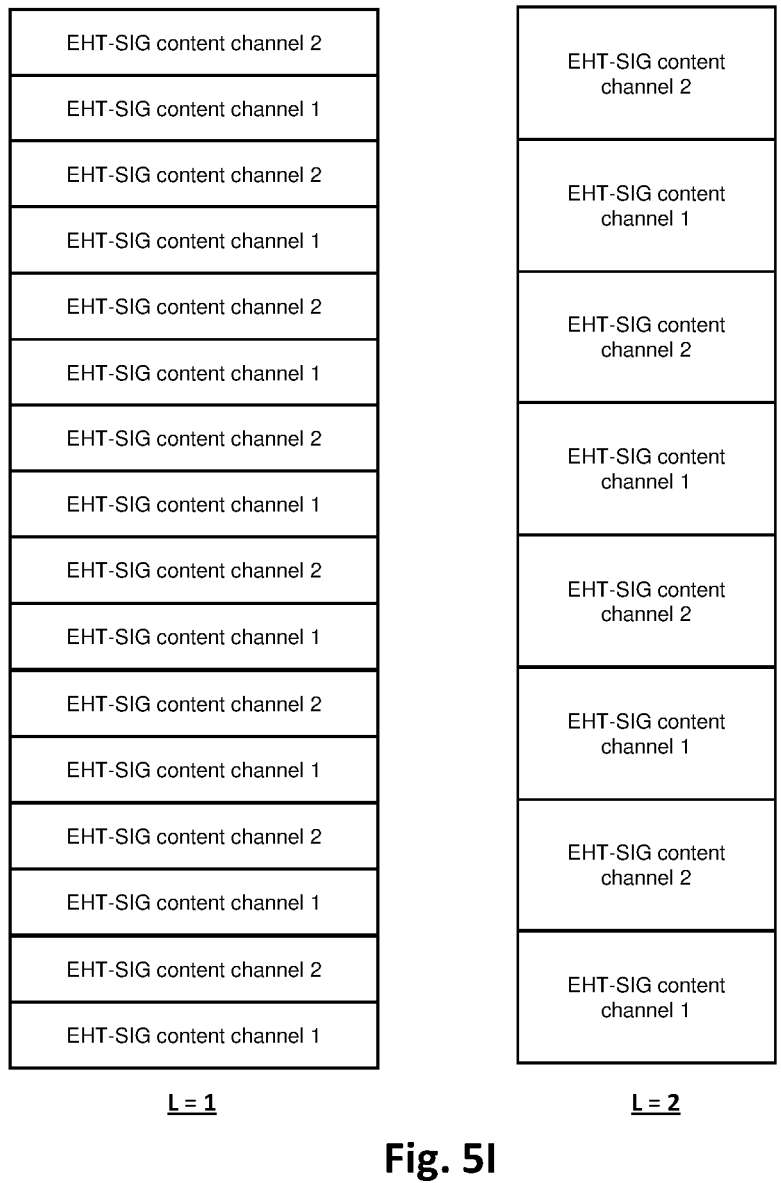
FIG. 5I shows a diagram of mapping of two EHT-SIG content channels when a 160+160 MHz or 320 MHz EHT basic PPDU is transmitted to multiple STAs.

FIG. 5I shows a diagram of mapping of the two EHT-SIG content channels in a 160+160 MHz or 320 MHz EHT basic PPDU. When L=1, in a 160+160 MHz or 320 MHz channel comprising sixteen 20 MHz frequency segments, EHT-SIG content channel 1 is duplicated and transmitted in the $1^{st}$, $3^{rd}$, $5^{th}$, $7^{th}$, $9^{th}$, $11^{th}$, $13^{th}$ and $15^{th}$ 20 MHz frequency segments while EHT-SIG content channel 2 is duplicated and transmitted in the $2^{nd}$, $4^{th}$, $6^{th}$, $8^{th}$, $10^{th}$, $12^{th}$, $14^{th}$ and $16^{th}$ 20 MHz frequency segments. When L=2, in a 160+160 MHz or 320 MHz channel comprising eight 40 MHz frequency segments, EHT-SIG content channel 1 is duplicated and transmitted in the $1^{st}$, $3^{rd}$, $5^{th}$ and $7^{th}$ 40 MHz frequency segments while EHT-SIG content channel 2 is duplicated and transmitted in the $2^{nd}$, $4^{th}$, $6^{th}$ and $8^{th}$ 40 MHz frequency segments.

Figure 5J:
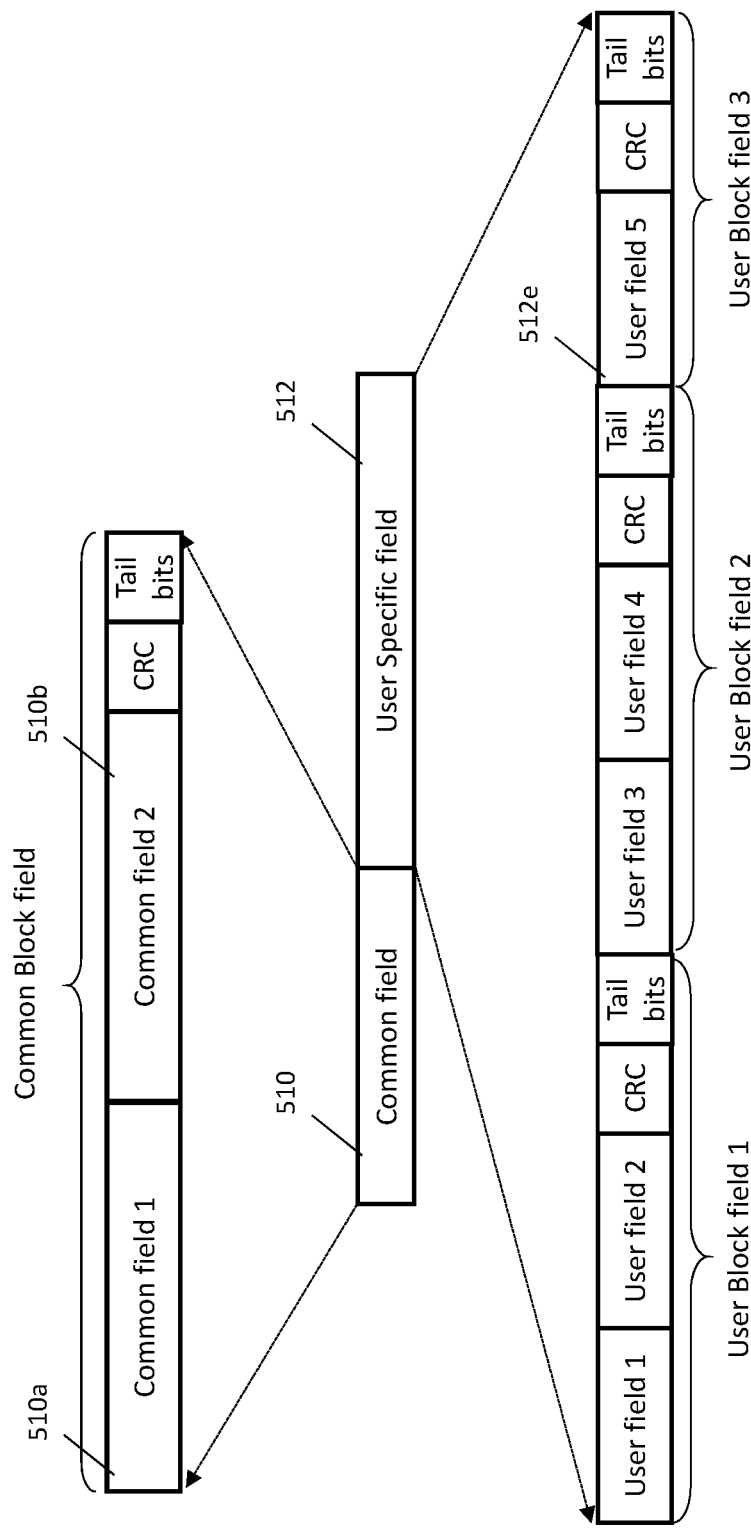
FIGS. 5J and 5K depicts two examples of the EHT-SIG content channel when an EHT basic PPDU is transmitted to multiple STAs.
Figure 5K:
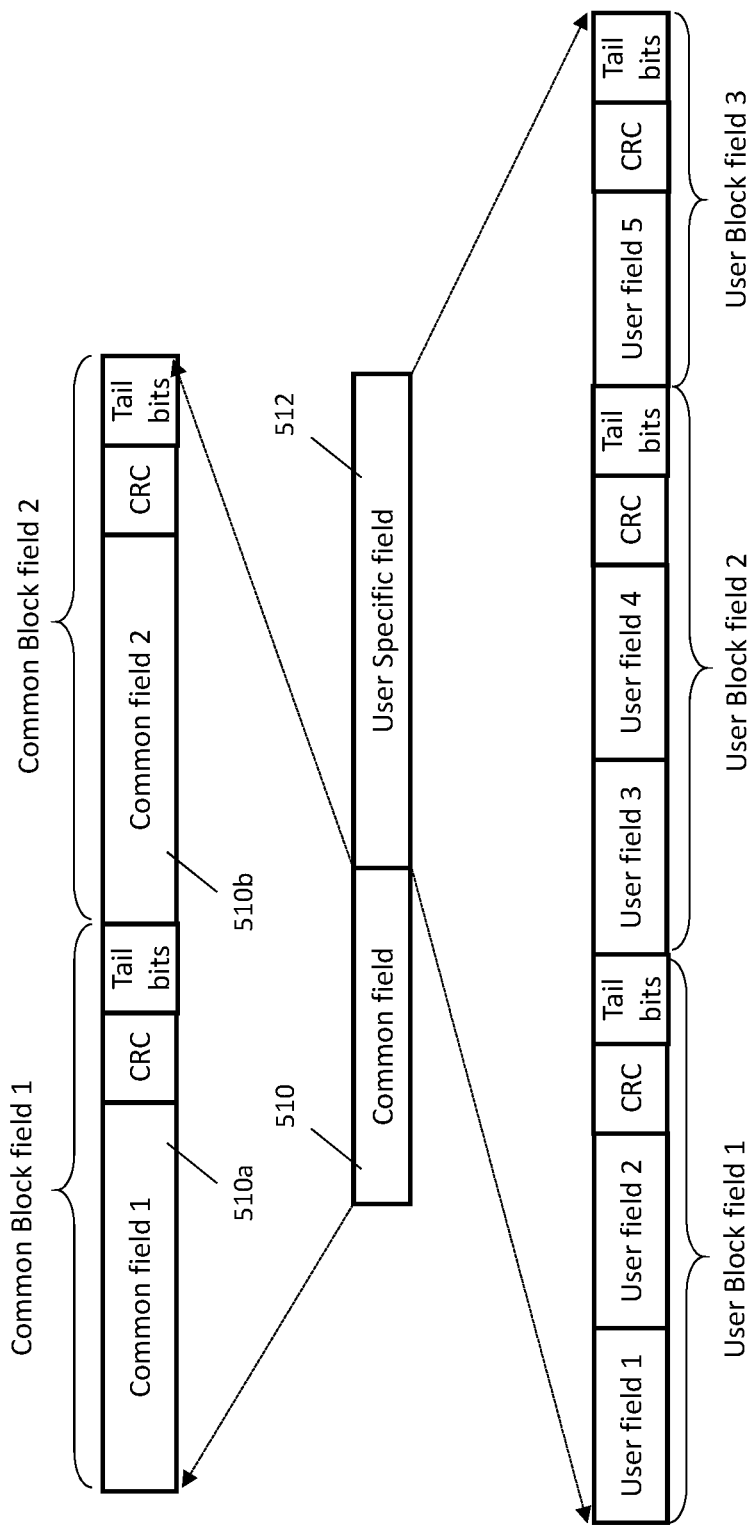

In various embodiments, for EHT PPDU transmitted to multiple STAs, a User Specific field may consist one or more User Block field(s), and each User Block field comprises one or two User fields. For example, a User Specific field 512 may contain 3 User Block field 1, 2 and 3 as illustrated in FIGS. 5J and 5K, the User Block field 1 comprising two user fields like User field 1 and User field 2, User Block field 2 comprising two user fields like User field 3 and User field 4, and User Block field 3 comprising one User field 5, where the one or two user fields in each User Block fields 1 to 3 is appended with a CRC field for detecting error and tail bits. In an embodiment, the last User Block may consist of one or two user fields depending on the total number of user fields that are allowed in the User Specific field 512 referring to an odd or even number.

Notwithstanding, the Common field comprising the Common field 1 and the Common field 2 can be jointly encoded (Option 1) or separately encoded (Option 2), resulting in two different EHT-SIG field format options. FIG. 5J depicts an example format of EHT-SIG field 504 in an event of an EHT basic PPDU transmitted to multiple STAs where Common field 1 and Common field 2 are jointly encoded (Option 1). In this embodiment, in the Common field 510, the Common field 1 510*a* is followed by the Common field 2 510*b* to which a single block of CRC field and tail bits are appended. Such EHT-SIG field format with jointly encoded Common field may advantageously reduce the number of CRC fields and tail bits used in EHT-SIG field, thus reduce signaling overhead.

FIG. 5K depicts an example format of EHT-SIG field 504 in an event of an EHT basic PPDU transmitted to multiple STAs where the Common field 510 are separately encoded (Option 2). In this embodiment, a CRC field and tail bits may be included at the end of each separately encoded field, i.e. Common field 1 510*a* and Common field 2 510*b*.

Yet in an embodiment, when the EHT-SIG Compression field of the U-SIG field 502 is set to "1", indicating a full bandwidth MU-MIMO transmission, Common field 2 may not be present. In this case, both format option 1 and option 2 of EHT basic PPDU transmitted to multiple STAs are identical.

TABLE 3

An example format of Common field 1 when EHT basic PPDU is transmitted to multiple STAs

| Subfield name | Field size (bits) |
| --- | --- |
| LDPC Extra Symbol Segment | 1 |
| Pre-FEC Padding Factor | 2 |
| PE Disambiguity | 1 |
| Doppler | 1 |
| GI-LTF Size | 2 |
| EHT-LTF mode | 1 |
| Number Of EHT-LTF Symbols And Midamble Periodicity | 4 |
| Total | 12 |

Example formats of Common field 1 510*a* and Common field 2 510*b* when the EHT basic PPDU 500 is transmitted to multiple STAs are illustrated in tables 3 and 14 respectively. The Common field 1 510*a* may comprise a LDPC Extra Symbol Segment subfield, a Pre-FEC Padding Factor subfield, a PE Disambiguity subfield, a Doppler subfield, a GI-LTF Size subfield, an EHT-LTF Mode subfield and a Number Of EHT-LTF Symbols And Midamble Periodicity. The Common field 1 comprises a field size of 12 bits and is the same across all the EHT-SIG content channels. The Common field 2 510*b* may comprise a RU Allocation field and a Center 26-Tone RU field. The RU Allocation subfield in an EHT-SIG content channel corresponding to one or more 20 MHz frequency segment indicates the RU assignment, including the size of the RU(s) and their placement in the frequency domain, and may also indicate preamble puncturing pattern. The RU Allocation subfield and the Center 26-Tone RU subfield comprise different field size depending on the BW of the EHT basic PPDU. The Common field 2 may be also different among the EHT-SIG content channels depending on RU assignments. It is noted that when EHT-SIG Compression subfield of the U-SIG field 502 is set to "1", Common field 2 is not present.

Example formats of User field for non-MU MIMO allocation and MU-MIMO allocation are illustrated in tables 4 and 5 respectively. For non-MU MIMO allocation, a User field may comprise a STA ID field, an EHT MCS field, a DCM field, a NSTS field, a Coding field and a Beamformed field; whereas for MU-MIMO allocation, a User field may comprise a STA ID field, an EHT MCS field, a Spatial Configuration field and a Coding field. It should be appreciable and apparent to one of ordinary skilled in the art that the standard definitions, protocols and functions of all fields of Common field 1, Common field 2 and User field listed in tables 3 to 5 and 14 can be obtained from the 802.11ax specification, unless specified otherwise in this specification.

TABLE 4

An example format of User field for non-MU-MIMO allocation when EHT basic PPDU is transmitted to multiple STAs

| Subfield name | Field size (bits) |
| --- | --- |
| STA ID | 11 |
| EHT MCS | 4 |
| DCM | 1 |
| NSTS | 4 |
| Coding | 1 |
| Beamformed | 1 |
| Total | 22 |

TABLE 5

An example format of User field for MU-MIMO allocation when EHT basic PPDU is transmitted to multiple STAs

| Subfield name | Field size (bits) |
| --- | --- |
| STA ID | 11 |
| EHT MCS | 4 |
| Spatial Configuration | 6 |
| Coding | 1 |
| Total | 22 |

Table 15 provides a summary of different EHT-SIG field formats in EHT basic PPDU depending on how it is encoded according to various embodiments provided in the present disclosure. When the EHT basic PPDU is transmitted to a single STA, i.e. SU/MU Flag field of U-SIG field is set to "0", the Common field of EHT-SIG field comprises a single Common field 1 and the User Specific field comprise a single User field. The Common field and the User Specific field can be separately encoded, i.e. option 1, or jointly encoded, i.e. option 2. On the other hand, when the EHT basic PPDU is transmitted to multiple STAs, i.e. SU/MU Flag field of U-SIG field is set to "1", the Common field and the User Specific field are separately encoded. The Common field comprises a Common field 1 and further comprise a Common field 2 if the EHT Compression field of the U-SIG field is set to "0". The Common field 1 and Common field 2 can be jointly encoded, i.e. option 1, or separately encoded, i.e. option 2.

Figure 6:
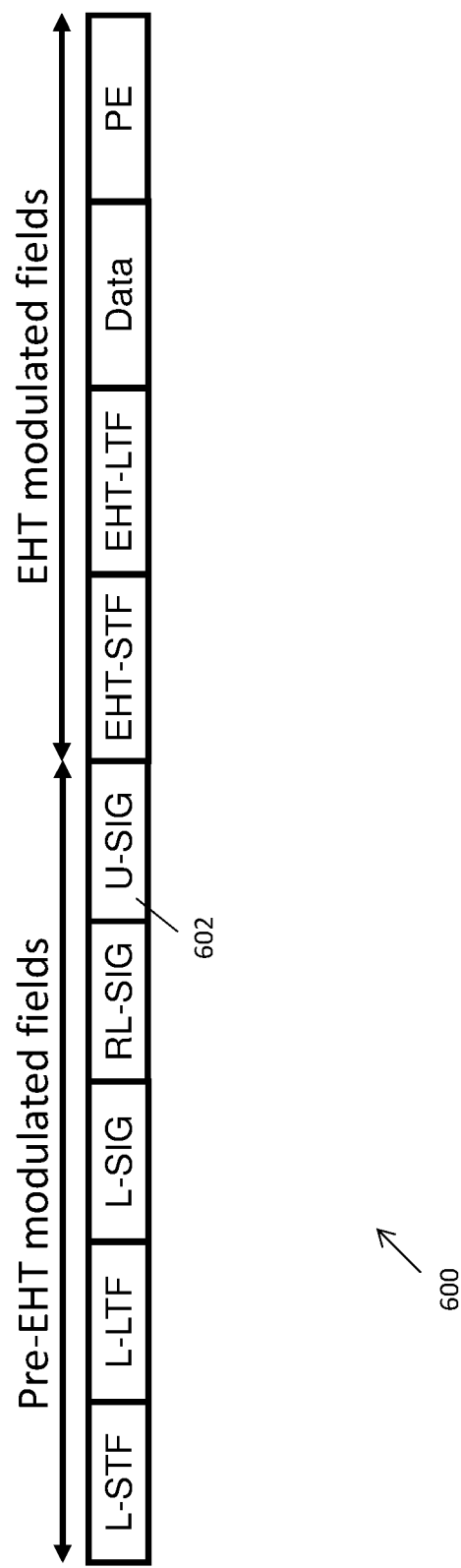
FIG. 6 depicts an example format of an EHT TB PPDU.

FIG. 6 depicts an example format of an EHT TB PPDU 600. The EHT TB PPDU 600 has a similar structure as that of EHT basic PPDU 500 but without EHT-SIG field 504. The EHT TB PPDU 600 may include a L-STF, a L-LTF, a L-SIG field, a FIF, a U-SIG field 602, an EHT-STF, an EHT-LTF, a Data field and a PE field. The L-STF, the L-LTF, the L-SIG, the RL-SIG and the U-SIG field 602 may be grouped as pre-EHT modulated fields, while the EHT-STF, the EHT-LTF, the Data field and the PE field may be grouped as EHT modulated fields. An EHT TB PPDU can be used for trigger-based communications that is in response to a soliciting triggering frame. For example, EHT TB PPDUs can be used for transmitting BA frames 414, 415 by STAs 404, 406 when EHT basic PPDU 410 is transmitted to STAs 404, 406 and contains one or more triggering frame, as illustrated in FIG. 4A.

Table 6 depicts an example format of U-SIG field 602 of EHT TB PPDU 600. Similar to EHT basic PPDU 500, the U-SIG field 602 comprises two parts, U-SIG1 and U-SIG2, each comprising 26 data bits. In this embodiment, all version independent bits may be included in U-SIG1. The first part of U-SIG field 602, i.e. U-SIG1, comprises a PHY Version Identifier field, a UL/DL Flag field, a BSS Color field, a TXOP Duration field, a PPDU Format field and a BW field. The PHY Version Identifier field is used to identify the exact PHY version starting with 802.11be. The second part of U-SIG field 602, i.e. U-SIG2, comprises Spatial Reuse 1 to 4 fields, followed by a CRC field and tail bits. Information of some of the field in U-SIG field 602 (e.g. BW field and Spatial Reuse 1 to 4 fields) can be copied from the corresponding triggering frame soliciting the transmission of EHT TB PPDU 600. It should be appreciated and apparent to one of ordinary skilled in the art that that the standard definitions, protocols and functions of most of the fields in U-SIG field 602 of EHT TB PPDU 600 can be obtained from the 802.11ax specification.

TABLE 6

An example format of U-SIG field in EHT TB PPDU

| | Field name | Field size (bits) |
| --- | --- | --- |
| U-SIG-1 | PHY Version Identifier | 3 |
| | UL/DL Flag | 1 |
| | BSS Color | 6 |
| | TXOP Duration | 7 |
| | Reserved | 4 |
| | PPDU Format | 1 |
| | Reserved | 1 |
| | BW | 3 |
| U-SIG2 | Spatial Reuse 1 | 4 |
| | Spatial Reuse 2 | 4 |
| | Spatial Reuse 3 | 4 |
| | Spatial Reuse 4 | 4 |
| | CRC | 4 |
| | Tail | 6 |
| | Total | 52 |

Figure 4B:
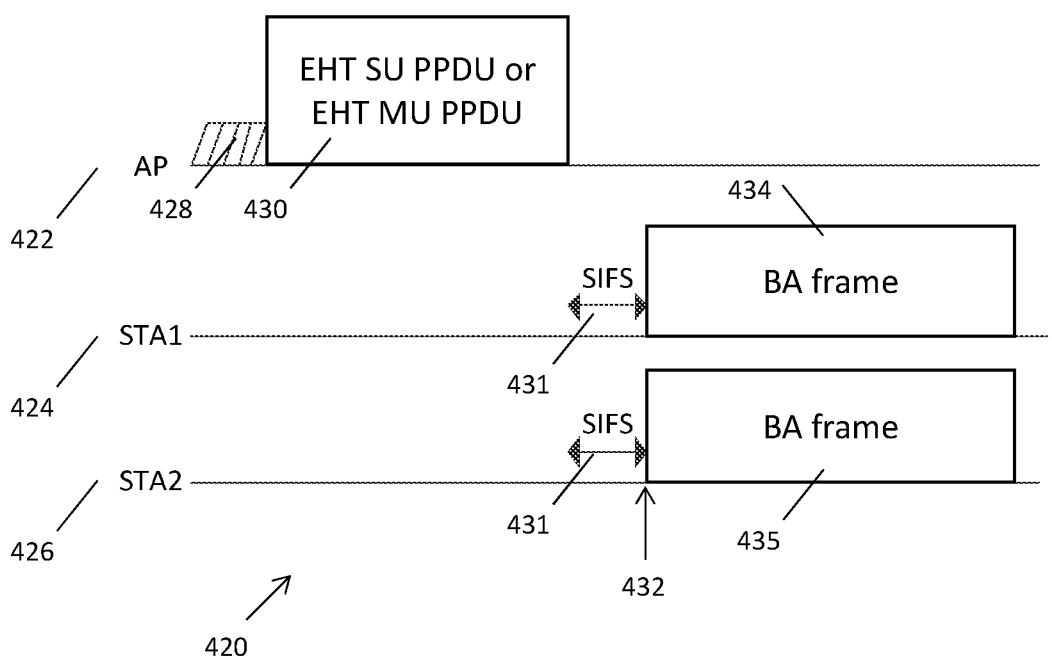
FIG. 4B depicts a flow chart illustrating a downlink communication according to another embodiment.

FIG. 4B depicts a flow chart 420 illustrating a downlink communication according to another embodiment, where the downlink communication is between an AP 422 and a single communication apparatus 422 or between an AP 422 and multiple communication apparatuses like STAs 424, 426. Contention based channel access procedures, e.g. EDCA procedures, is illustrated by block 428, and SIFS 431 is illustrated. The AP 422 may generate a transmission signal (for example an EHT SU PPDU or EHT MU PPDU) 430 comprising a first signal field which comprises a first part, a second part and a third part, each comprising an equal number of data bits, wherein the data bits of the second part and the third part of the first signal field do not comprise version independent bits. The first part of the first signal field of the transmission signal 430 may have a single format regardless of whether the transmission signal 430 is transmitted to STA 424 or STAs 424, 426. The second part or the third part of the first signal field of the transmission signal 430 may have a different format depending on whether the transmission signal 430 is transmitted to STA 424 or STAs 424, 426. In an embodiment, the transmission signal 430 may comprise a second signal field when the transmission signal 430 is transmitted to STAs 424, 426. In this case, the first signal field comprises information for interpreting the second signal field. In an embodiment, the first signal field may comprise a preamble puncturing bitmap when the transmission signal 430 is transmitted to STA 424. The ratio transmitter of AP 422 may transmit the generated transmission signal 430 to STA 424 or STAs 424, 426.

After the last symbol of the transmission signal 430 is transmitted, a SIF 431 may take effect, and at 432, the radio transmitters of STAs 424, 426 may simultaneously transmit their respective BA frames 434, 435 when the transmission signal 430 is transmitted to STAs 424, 426; or the radio transmitter of STA 424 may transmit its own BA frame 434 when the transmission signal 430 is transmitted to STA 424.

According to the present disclosure, EHT SU PPDU and EHT MU PPDU can be used for non-trigger-based communications. In particular, EHT SU PPDU is used for transmission to a single STA while EHT MU PPDU is used for transmission to multiple STAs.

FIGS. 7A and 7B depicts respective example formats of EHT SU PPDU 700 and EHT MU PPDU 704. The EHT MU PPDU 704 has a similar format to EHT basic PPDU 500, which comprises a L-STF, a L-LTF, a L-SIG field, a RL-SIG field, a U-SIG field 702, an EHT-SIG field 708, an EHT-STF, an EHT-LTF, a Data field and a PE field. The L-STF, the L-LTF, the L-SIG field, the RL-SIG field, the U-SIG field 702 and the EHT-SIG field 708 may be grouped as pre-EHT modulated fields, while the EHT-STF, the EHT-LTF, the Data field and the PE field may be grouped as EHT modulated fields. On the other hand, EHT SU PPDU 700 may comprise a similar format to EHT basic PPDU 500 but without EHT-SIG field. This may advantageously reduce the signaling overhead of EHT SU PPDU.

The U-SIG fields 702 include all version independent bits and for EHT SU PPDU, all version dependent bits, but for EHT MU PPDU, a part of the version dependent bits. According to various embodiments, the U-SIG field 702 has a duration of two OFDM symbols. Data bits in the U-SIG field 702 are jointly encoded and modulated in the same manner as the HE-SIG-A field of 802.11ax. Modulated data bits in the U-SIG field 702 are mapped to 52 data tones of each of the two OFDM symbols in the same manner as the HE-SIG-A field of 802.11ax.

In this present disclosure, the U-SIG field 702 comprises one or two content channels depending on the BW of the EHT SU PPDU 700 or EHT MU PPDU 704. In particular, the U-SIG field 702 of a 20 MHz EHT SU or MU PPDU contains one U-SIG content channel, while the U-SIG field

702 of an EHT SU or MU PPDU that has a BW of 40 MHz or wider contains two U-SIG content channels.

FIG. 7C shows a diagram of mapping of two U-SIG content channels in a 40 MHz EHT SU or MU PPDU. A 40 MHz channel comprises two 20 MHz frequency segments. The two U-SIG content channels (namely, U-SIG content channel 1 and U-SIG content channel 2) are transmitted in the $1^{st}$ and $2^{nd}$ 20 MHz frequency segments, respectively. FIG. 7D shows a diagram of mapping of two U-SIG-B content channels in an 80 MHz EHT SU or MU PPDU. An 80 MHz channel comprises four 20 MHz frequency segments. U-SIG content channel 1 is duplicated and transmitted in the $1^{st}$ and $3^{rd}$ 20 MHz frequency segments while U-SIG content channel 2 is duplicated and transmitted in the $2^{nd}$ and $4^{th}$ 20 MHz frequency segments.

Figure 7E:
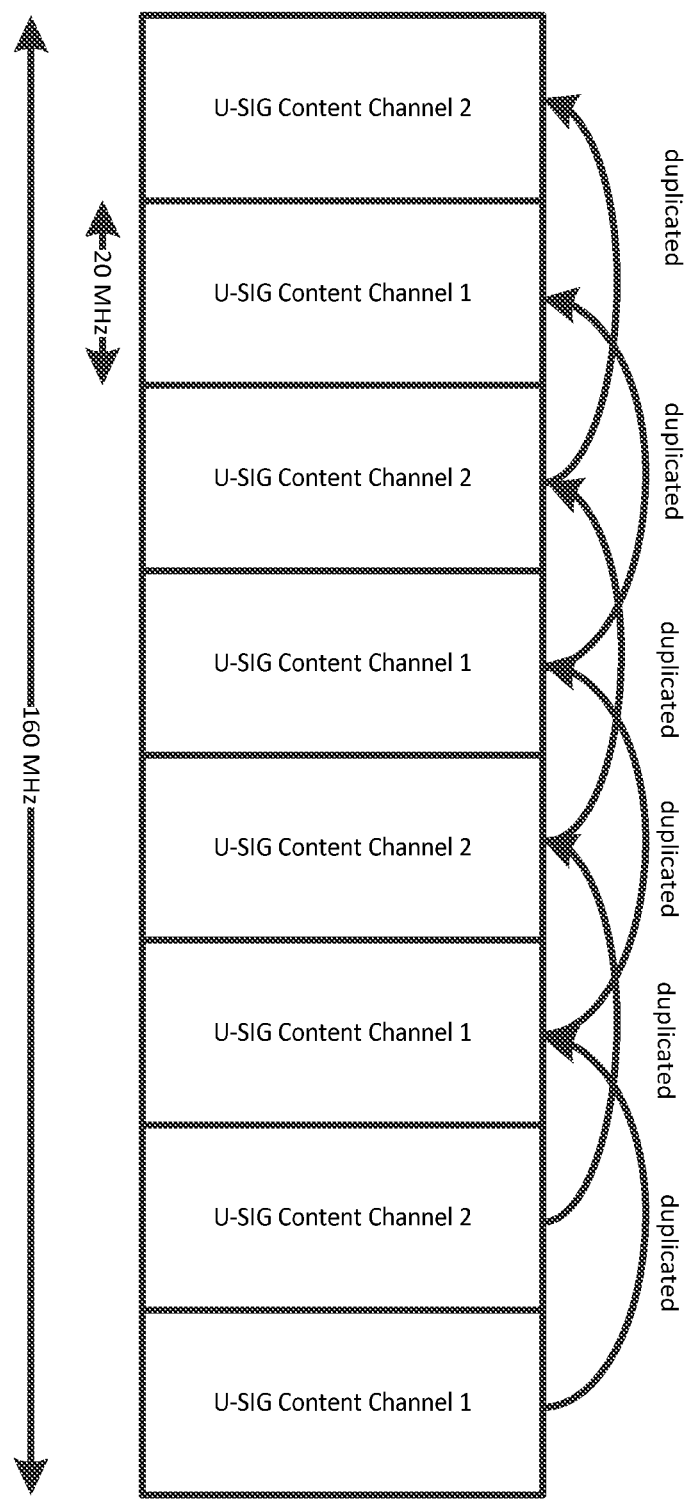
FIG. 7E shows a diagram of mapping of two U-SIG content channels in an 80+80 MHz or 160 MHz EHT SU or MU PPDU.
Figure 7F:
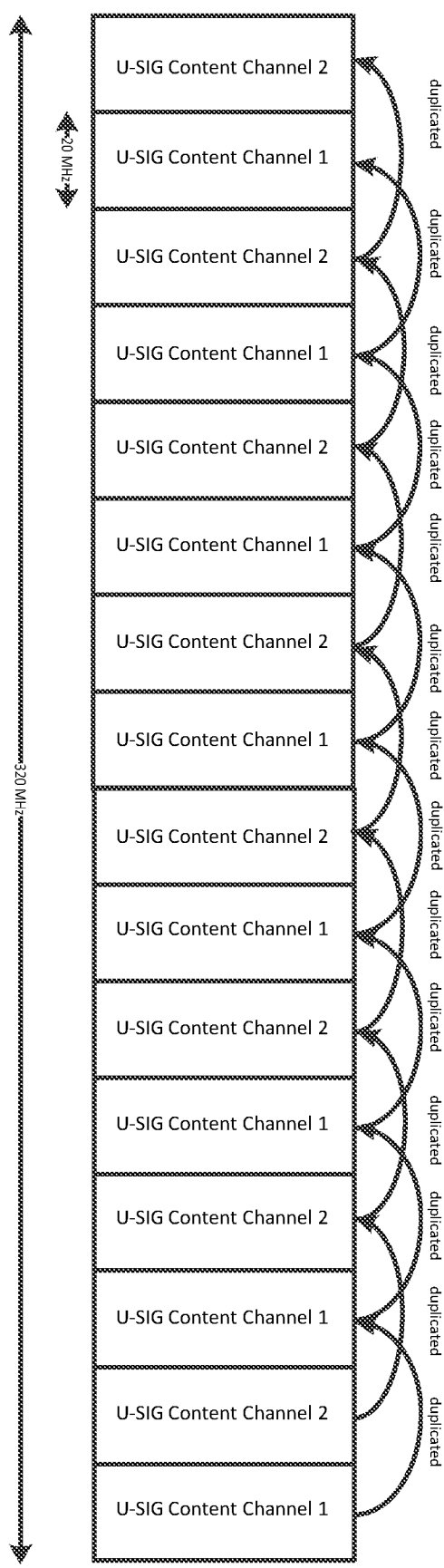
FIG. 7F shows a diagram of mapping of two U-SIG content channels in a 160+160 MHz or 320 MHz EHT SU or MU PPDU.

FIG. 7E shows a diagram of mapping of two U-SIG content channels in an 80+80 MHz or 160 MHz EHT MU PPDU. An 80+80 MHz or 160 MHz channel comprising eight 20 MHz frequency segments, U-SIG content channel 1 is duplicated and transmitted in the $1^{st}$, $3^{rd}$, $5^{th}$ and $7^{th}$ 20 MHz frequency segments while U-SIG content channel 2 is duplicated and transmitted in the $2^{nd}$, $4^{th}$, $6^{th}$ and $8^{th}$ 20 MHz frequency segments. FIG. 7F shows a diagram of mapping of two U-SIG content channels in a 160+160 MHz or 320 MHz EHT MU PPDU. A 160+160 MHz or 320 MHz channel comprising sixteen 20 MHz frequency segments, U-SIG content channel 1 is duplicated and transmitted in the $1^{st}$, $3^{rd}$, $5^{th}$, $7^{th}$, $9^{th}$, $11^{th}$, $13^{th}$ and $15^{th}$ 20 MHz frequency segments while U-SIG content channel 2 is duplicated and transmitted in the $2^{nd}$, $4^{th}$, $6^{th}$, $8^{th}$, $10^{th}$, $12^{th}$, $14^{th}$ and $16^{th}$ 20 MHz frequency segments. When L=2, in a 160+160 MHz or 320 MHz channel comprising eight 40 MHz frequency segments, U-SIG content channel 1 is duplicated and transmitted in the $1^{st}$, $3^{rd}$, $5^{th}$ and $7^{th}$ 40 MHz frequency segments while U-SIG content channel 2 is duplicated and transmitted in the $2^{nd}$, $4^{h}$, $6^{th}$ and $8^{th}$ 40 MHz frequency segments.

Figure 7G:
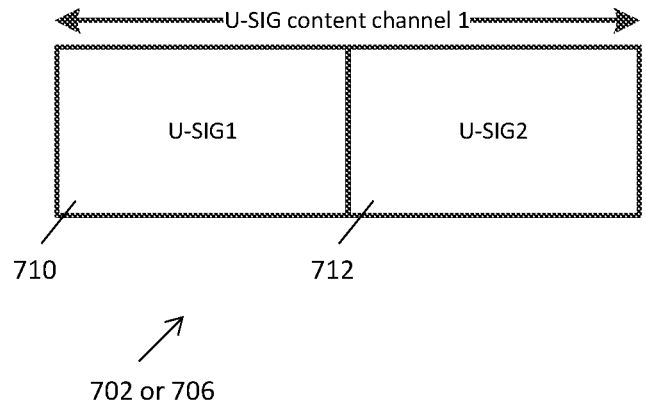
FIG. 7G depicts the U-SIG content channel 1 in more details.
Figure 7H:
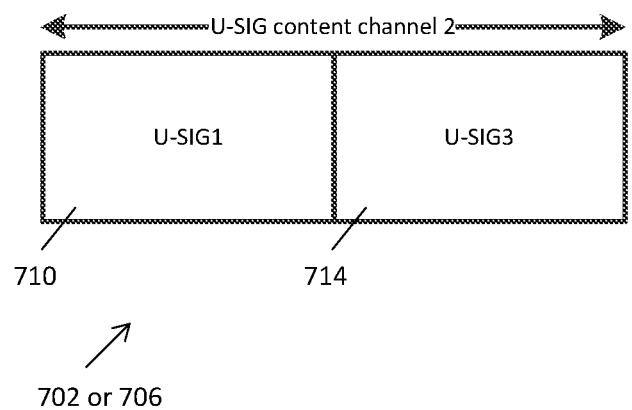
FIG. 7H depicts the U-SIG content channel 2 in more details.

According to the present disclosure, a U-SIG field 702 comprises three parts: U-SIG1 710, U-SIG2 712 and U-SIG3 714, each comprising 26 data bits. U-SIG1 710 comprises all version independent bits and a part of version dependent bits, while U-SIG2 712 and U-SIG3 714 comprise remaining version dependent bits. FIGS. 7G and 7H depict example formats of U-SIG content channel 1 and 2 respectively. U-SIG content channel 1 may comprise U-SIG1 710 and U-SIG2 712, while U-SIG content channel 2 may comprise U-SIG1 710 and U-SIG3 712. In an embodiment, the U-SIG content channel 1 includes the version dependent bits which are necessary for interpreting 20 MHz EHT SU or MU PPDU. The effect of such configuration where U-SIG1 710 is included in both U-SIG content channel 1 and 2 is that a legacy STA is able to decode any U-SIG content channel to obtain version independent information.

TABLE 7

An example format of U-SIG1 of U-SIG field

| Field name | Field size (bits) |
| --- | --- |
| PHY Version Identifier | 3 |
| UL/FL Flag | 1 |
| BSS Color | 6 |
| TXOP Duration | 7 |
| PPDU Format | 2 |
| BW | 3 |
| LDPC Extra Symbol Segment | 1 |
| Pre-FEC Padding Factor | 2 |
| PE Disambiguity | 1 |
| Total | 26 |

Table 7 shows an example format of U-SIG1 710 of U-SIG field in EHT SU or MU PPDU. The U-SIG1 710 may comprise a PHY Version Identifier field, an UL/DL Flag field, a BSS Color field, a TXOP Duration field, a PPDU Format field, a BW field, a LDPC Extra Symbol Segment field, a Pre-FEC Padding Factor field and a Disambiguity field. When PHY Version Identifier field refers to 802.11be, the PPDU Format field is set to "0" to indicate EHT SU PPDU, "1" to indicate an EHT MU PPDU and "2" to indicate EHT TB PPDU. A preamble puncturing mode is only allowed when the PPDU's BW is 80 MHz or higher. On this basis, the BW field is set to "0" for 20 MHz, "1" for 40 MHz, "2" for 80 MHz non-preamble puncturing mode, "3" for 160 MHz and 80+80 MHz non-preamble puncturing mode, "4" for 320 MHz and 160+160 MHz non-preamble puncturing mode, "5" for 80 MHz preamble puncturing mode, "6" for 160 MHz and 80+80 MHz preamble puncturing mode, "7" for 320 MHz and 160+160 MHz preamble puncturing mode.

TABLE 8

An example format of U-SIG2 of U-SIG field when the PPDU Format field refers to EHT MU PPDU

| Field name | Field size (bits) |
| --- | --- |
| EHT-SIG Compression | 1 |
| EHT-SIG EHT MCS | 3 |
| EHT-SIG DCM | 1 |
| Number Of EHT-SIG Symbols Or MU-MIMO Users | 4 |
| STBC | 1 |
| Doppler | 1 |
| GI-LTF Size | 2 |
| Number Of EHT-LTF Symbols And Midamble Periodicity | 3 |
| CRC | 4 |
| Tail | 6 |
| Total | 26 |

Table 8 shows an example format of U-SIG2 712 of U-SIG field when the PPDU Format field refers to EHT MU PPDU. In this example, the U-SIG2 may comprise an EHT-SIG Compression field, an EHT-SIG EHT MCS field, an EHT-SIG DCM field, a Number Of EHT-SIG Symbols Or MU-MIMO Users field, a STBC filed, a Doppler field, a GI-LTF Size field, a Number of EHT-LTF Symbols And Midamble Periodicity field, a CRC field and tails bits. Table 9 shows an example format of U-SIG2 712 of U-SIG field when the PPDU Format field refers to EHT SU PPDU. In this example, the U-SIG2 may comprises an EHT MCS field, a DCM field, a Beamformed field, a Beam Change field, a STBC field, a Doppler field, a GI-LTF Size field, a NSTS And Midamble Periodicity field, a CRC field and tails bits.

TABLE 9

An example format of U-SIG2 when the PPDU Format field refers to EHT SU PPDU

| Field name | Field size (bits) |
|---|---|
| EHT MCS | 4 |
| DCM | 1 |
| Beamformed | 1 |
| Beam change | 1 |
| STBC | 1 |
| Doppler | 1 |
| GL-LTF Size | 2 |
| NSTS And Midamble Periodicity | 3 |
| Reserved | 2 |
| CRC | 4 |
| Tail | 6 |
| Total | 26 |

Table 10 shows an example format of U-SIG3 714 of U-SIG field when the PPDU Format field refers to EHT SU PPDU. In this example, the U-SIG3 may comprise an EHT-LTF Mode field, a Spatial Reuse field, a NSTS MSB (most significant bit) field, a Preamble Puncturing Bitmap field, a CRC field and Tail bits. Due to the fixed bit width of U-SIG field, the Preamble Puncturing Bitmap field has a fixed bit width of 7 bits. In an embodiment where the BW field refers to 20 MHz, 40 MHz, 80 MHz, 160/80+80 MHz, or 320/160+160 MHz non-preamble puncturing mode in the U-SIG1, the Preamble Puncturing Bitmap field is reserved. When the BW field refers to 80 MHz preamble puncturing mode, each of the first 3 bits indicates whether a 20 MHz frequency segment which is not primary 20 MHz is punctured, and the remaining 4 bits are reserved. When the BW field refers to 160 and 80+80 MHz preamble puncturing mode, each bit indicates whether a 20 MHz frequency segment which is not the primary 20 MHz is punctured. When the BW field refers to 320 and 160+160 MHz preamble puncturing mode, each bit indicates whether a 40 MHz frequency segment which is not the primary 40 MHz is punctured. As such, the above features may advantageously allow preamble puncturing for a PPDU transmitted to a single STA using an EHT SU PPDU.

TABLE 10

An example format of U-SIG3 of U-SIG field when PPDU Format field refers to EHT SU PPDU

| Field name | Field size (bits) |
|---|---|
| EHT-LTF Mode | 1 |
| Spatial Reuse | 4 |
| NSTS MSB | 1 |
| Preamble Puncturing Bitmap | 7 |
| Reserved | 3 |
| CRC | 4 |
| Tail | 6 |
| Total | 26 |

Table 11 shows an example format of U-SIG3 714 of U-SIG field when the PPDU Format field refers to EHT MU PPDU, i.e. set to "1". In this example, the U-SIG3 may comprise an EHT-LTF Mode field, a Spatial Reuse field, a Number Of EHT-LTF Symbols MSB field, a CRC field and tail bits. The above U-SIG3 examples of EHT SU and MU PPDU are provided by assuming that 20 MHz EHT PPDU comprises up to 8 EHT-LTF symbols which are not subcarrier interleaved and disallows parameterized spatial reuse (PSR) based spatial reuse operation. Therefore, U-SIG3 714 is not required for interpreting 20 MHz EHT PPDU. It is appreciable and apparent to one of ordinary skilled in the art that the standard definitions, protocols and functions of all the fields of U-SIG fields listed in tables 10 to 14 can be obtained from the 802.11ax specification, unless specified otherwise in this specification.

TABLE 11

An example format of U-SIG3 of U-SIG field when PPDU Format field refers to EHT MU PPDU

| Field name | Field size (bits) |
|---|---|
| EHT-LTF Mode | 1 |
| Spatial Reuse | 4 |
| Number Of EHT-LTF Symbols MSB | 1 |
| Reserved | 10 |
| CRC | 4 |
| Tail | 6 |
| Total | 26 |

Returning to 7B, the EHT MU PPDU 704 comprises an EHT-SIG field 708. The EHT-SIG field 708 may comprise remaining version dependent bits for EHT MU PPDU 704. Similar to EHT-SIG field 506 when EHT basic PPDU is transmitted to multiple STAs, an EHT-SIG field 708 has a variable MCS and variable length. It has a Common field and a User Specific field, which together are referred to an EHT-SIG content channel. The Common field and the User-Specific field are separately encoded, and there is one or two EHT-SIG content depending on the BW of the EHT MU PPDU 704. The Common field 716 may comprise a Common field 2. The User Specific field comprises one or more User fields.

Figure 7I:
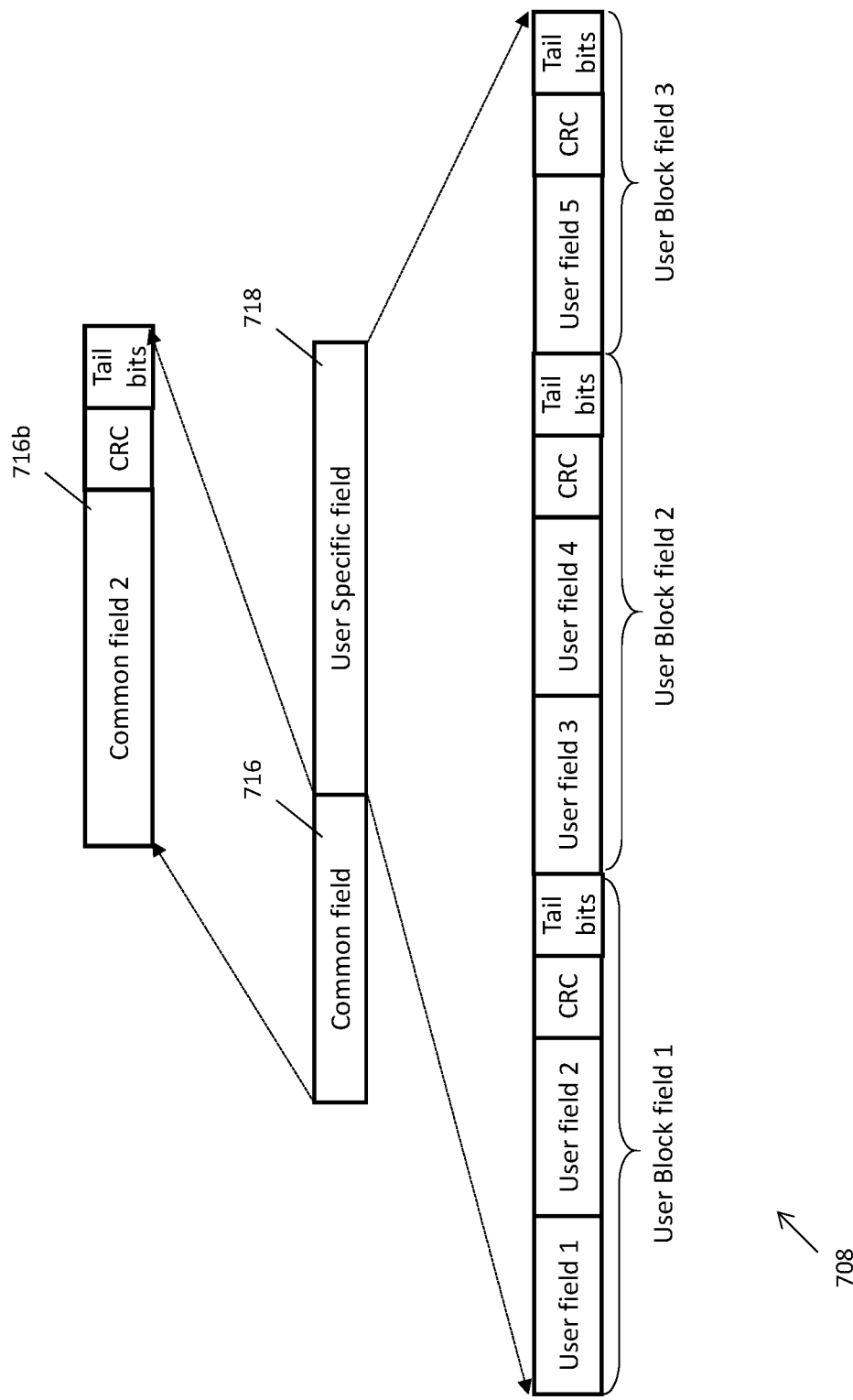
FIG. 7I depicts an example of the EHT-SIG content channel of an EHT MU PPDU.

FIG. 7I depicts an example EHT-SIG content channel of EHT MU PPDU 704 in more details. The Common field 716 comprises a Common field 2 716*b*, a CRC field and tail bits. The Common field 2 716*b* may have a same format as the Common field 2 506*b* of EHT basic PPDU 500 depicted in FIGS. 5J to 5K and table 14. Similarly, the User Specific field 718 may consist one or more User Block field(s), each User Block field comprises one or two User fields. For example, a User Specific field 718 may contain 3 User Block fields 1,2 and 3, the User Block field 1 comprising two user fields like User field 1 and User field 2, User Block field 2 comprising two user fields like User field 3 and User field 4, and User Block field 3 comprising one User field 5, where the one or two user fields in each User Block fields 1 to 3 is appended with a CRC field for detecting error and tail bits. In an embodiment, the last User Block may consist of one or two user fields depending on the total number of user fields that are allowed in the User Specific field 718 referring to an odd or even number. The User field for non-MU-MIMO allocation and MU-MIMO allocation may have a same format as that of EHT basic PPDU 500 depicted in tables 4 and 5 respectively.

Figure 8:
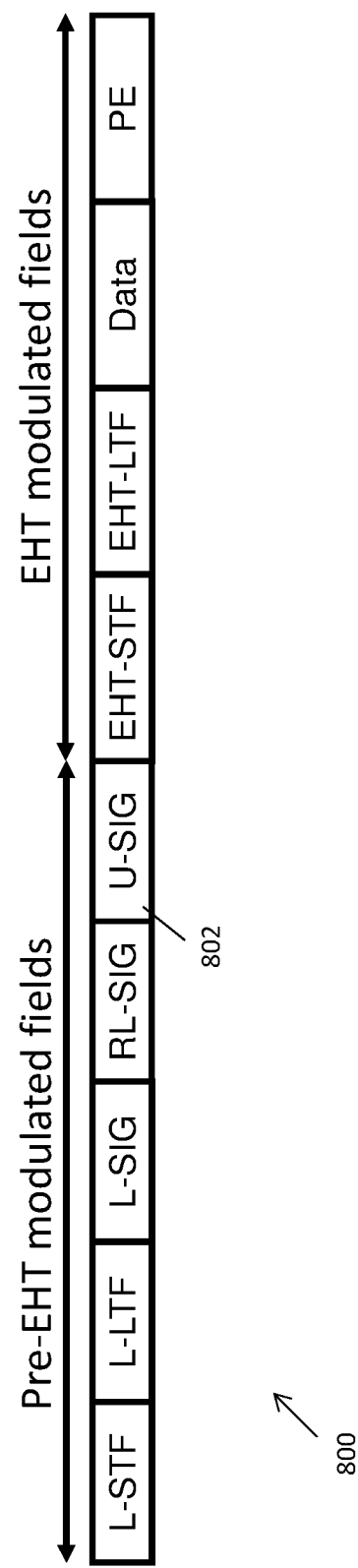
FIG. 8 depicts another example format of an EHT TB PPDU.

FIG. 8 depicts another example format of an EHT TB PPDU 800. The EHT TB PPDU 800 has a similar structure to EHT SU PPDU 700. The EHT TB PPDU 800 may include a L-STF, a L-LTF, a L-SIG field, an RL-SIG field, a U-SIG field 802, an EHT-STF, an EHT-LTF, a Data field and a PE field. The L-STF, the L-LTF, the L-SIG field, the RL-SIG field and the U-SIG field 802 may be grouped as pre-EHT modulated fields, while the EHT-STF, the EHT-LTF, the Data field and the PE field may be grouped as EHT modulated fields. An EHT TB PPDU 800 is used for trigger-based communications that is in response to a soliciting triggering frame. For example, EHT TB PPDUs can be used for transmitting BA frames 434, 435 by STAs 424, 426 when EHT basic PPDU 430 is transmitted to STAs 424, 426 and contains one or more triggering frame, as illustrated in FIG. 4B.

The U-SIG field 802 of EHT TB PPDU 800 comprises one U-SIG content channel. The U-SIG field 802 comprises two parts, namely U-SIG1 and U-SIG2, each comprising 26 data bits. Table 12 depicts an example format of U-SIG field 802 of EHT TB PPDU 800. The first part of U-SIG field 802, i.e. U-SIG1, may include all version independent bits, comprising a PHY Version Identifier field, a UL/DL Flag field, a BSS Color field, a TXOP Duration field, a PPDU Format field and a BW field. The PHY Version Identifier field is used to identify the exact PHY version starting with 802.11be. The second part of U-SIG field 802, i.e. U-SIG2, comprises Spatial Reuse 1 to 4 fields, which information depending on PPDU format, followed by a CRC field and tail bits. Information of some of the field in U-SIG field 802 (e.g. BW field and Spatial Reuse 1 to 4 fields) can be copied from the corresponding triggering frame soliciting the transmission of EHT TB PPDU 800. It should be appreciated and apparent to one of ordinary skilled in the art that that the standard definitions, protocols and functions of most of the fields in U-SIG field 802 of EHT TB PPDU 800 can be obtained from the 802.11ax specification.

TABLE 12

An example format of U-SIG field of EHT TB PPDU

|  | Field name | Field size (bits) |
|---|---|---|
| U-SIG1 | PHY Version Identifier | 3 |
|  | UL/DL Flag | 1 |
|  | BSS Color | 6 |
|  | TXOP Duration | 7 |
|  | PPDU Format | 1 |
|  | BW | 3 |
|  | Reserved | 4 |
| U-SIG2 | Spatial Reuse 1 | 4 |
|  | Spatial Reuse 2 | 4 |
|  | Spatial Reuse 3 | 4 |
|  | Spatial Reuse 4 | 4 |
|  | CRC | 4 |
|  | Tail | 6 |
|  | Total | 52 |

Figure 9:
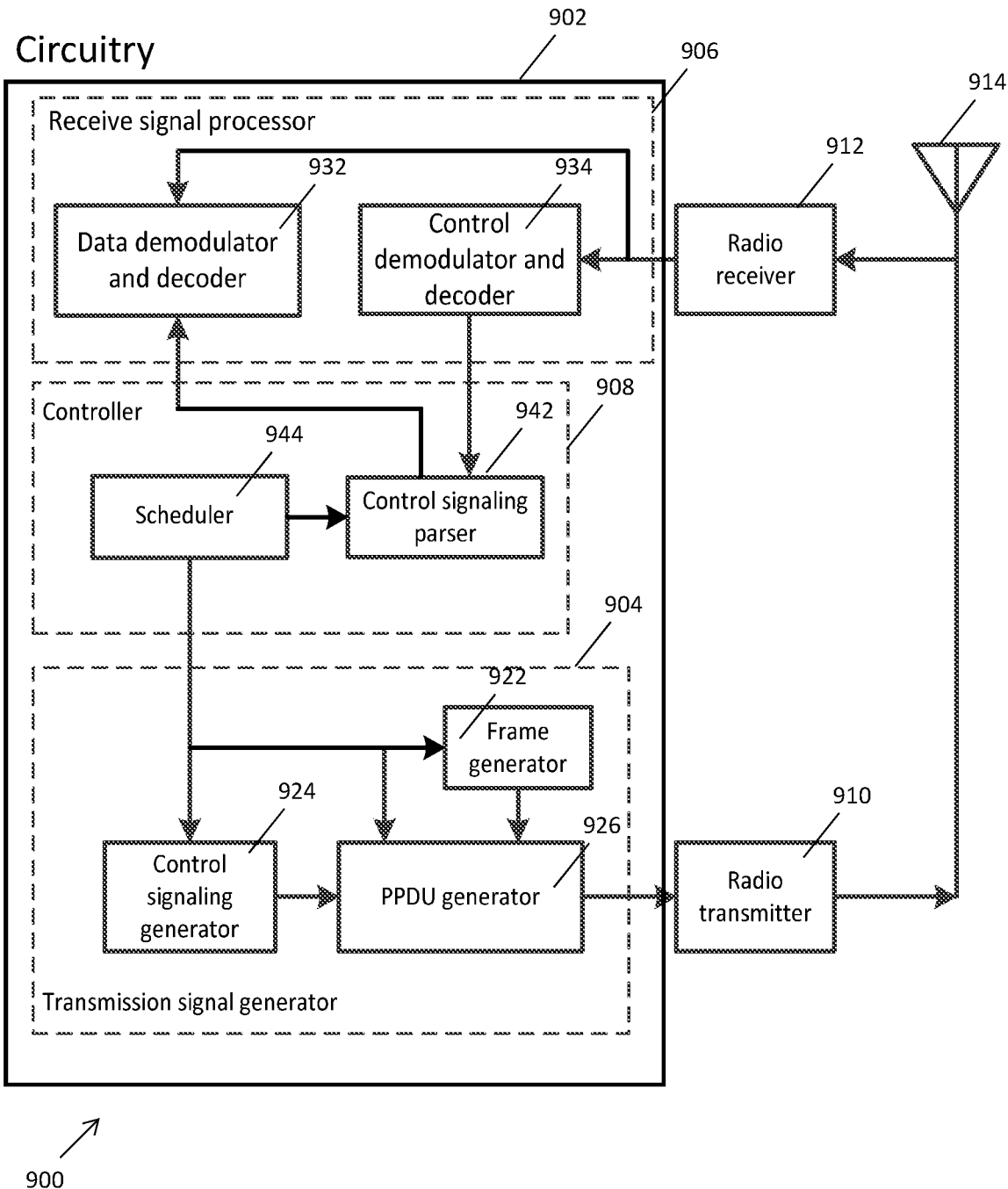
FIG. 9 shows a configuration of a communication device, for example an AP according to various embodiments.

FIG. 9 shows a configuration of a communication device 900, for example an AP according to various embodiments. Similar to the schematic example of the communication apparatus 300 shown in FIG. 3, the communication apparatus 900 includes circuitry 902, at least one radio transmitter 910, at least one radio receiver 912, at least one antenna 914 (for the sake of simplicity, only one antenna is depicted in FIG. 9). The circuitry 902 may include at least one controller 908 for use in software and hardware aided execution of tasks that the controller 908 is designed to perform communication for control singling. The circuitry 902 may further include a transmission signal generator 904 and a receive signal processor 906. The at least one controller 908 may control the transmission signal generator 904 and the receive signal processor 906. The transmission signal generator 904 may include a frame generator 922, a control signaling generator 924, and a PPDU generator 926. The frame generator 922 may generate MAC frames, e.g. data frames or triggering frames. The control signaling generator 924 may generate control signaling fields of PPDUs to be generated (e.g. U-SIG fields and EHT-SIG fields of EHT basic PPDUs or EHT MU PPDUs, or U-SIG fields of EHT SU PPDUs). The PPDU generator 926 may generate PPDUs (e.g. EHT basic PPDUs, EHT SU PPDUs or EHT MU PPDUs).

The receive signal processor 906 may include a data demodulator and decoder 934, which may demodulate and decode data portions of the received signals (e.g. data fields of EHT basic PPDUs, EHT SU PPDUs or EHT TB PPDUs). The receive signal processor 906 may further include a control demodulator and decoder 934, which may demodulate and decode control signaling portions of the received signals (e.g. U-SIG fields of EHT basic PPDUs, EHT SU PPDUs or EHT TB PPDUs and EHT-SIG fields of EHT basic PPDUs). The at least one controller 908 may include a control signal parser 942 and a scheduler 944. The scheduler 944 may determine RU information and user-specific allocation information for allocations of downlink SU or MU transmissions and triggering information for allocations of uplink MU transmissions. The control signal parser 942 may analyse the control signaling portions of the received signals and the triggering information for allocations of uplink MU transmissions shared by the scheduler 944 and assist the data demodulator and decoder 932 in demodulating and decoding the data portions of the received signals.

Figure 10:
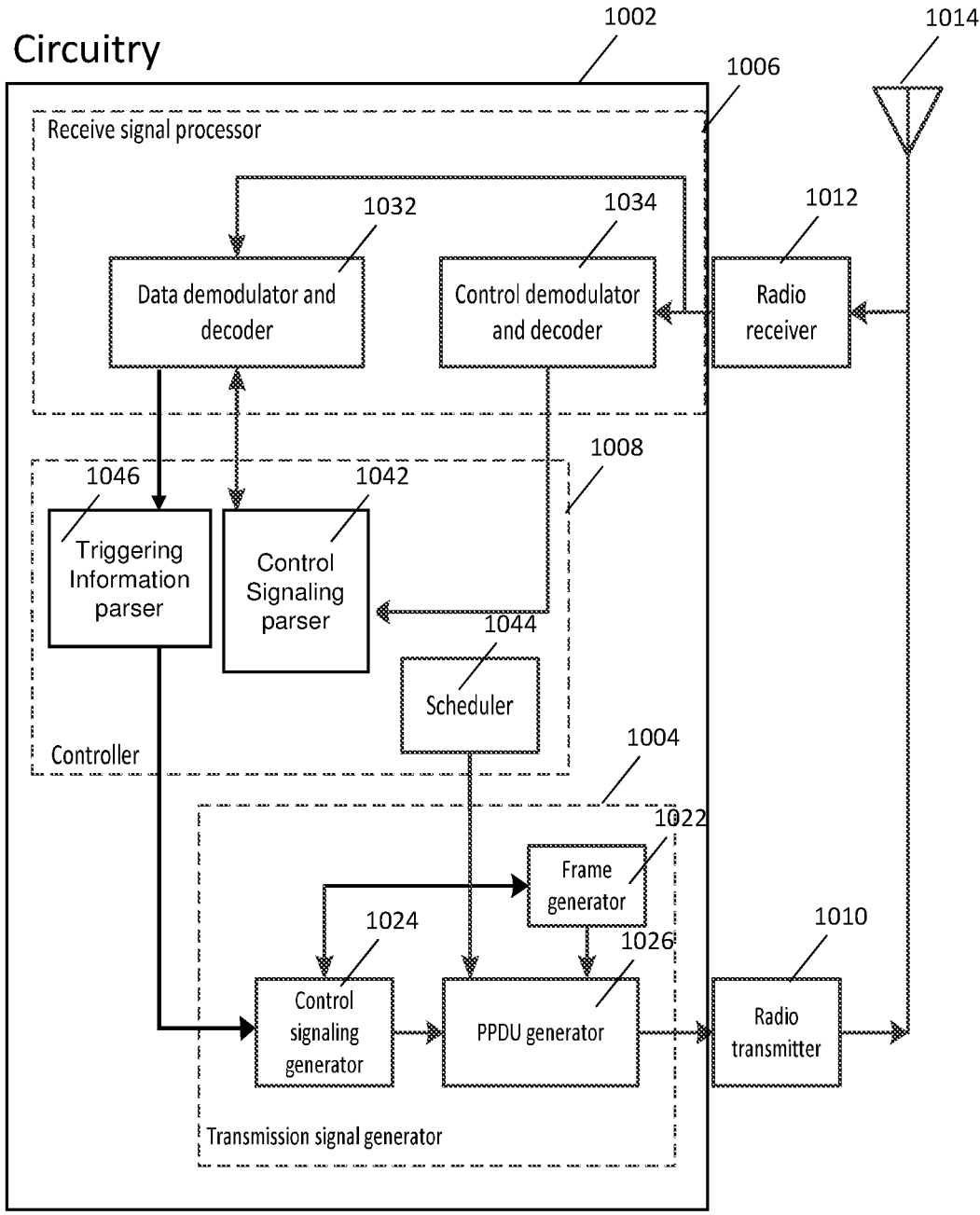
FIG. 10 shows a configuration of a communication device, for example an STA, according to various embodiments.

FIG. 10 shows a configuration of a communication apparatus 1000, for example a STA according to various embodiments. Similar to the schematic example of communication apparatus 300 shown in FIG. 3, the communication apparatus 1000 includes circuitry 1002, at least one radio transmitter 1010, at least one radio receiver 1012, at least one antenna 1014 (for the sake of simplicity, only one antenna is depicted in FIG. 10). The circuitry 1002 may include at least one controller 1008 for use in software and hardware aided execution of tasks that the controller 1008 is designed to perform communication for control signaling. The circuitry 1008 may further include a receive signal processor 1004 and a transmission signal generator 1006. The at least one controller 1008 may control the receive signal processor 1004 and the transmission signal generator 1006. The receive signal processor 1004 may include a data demodulator and decoder 1032 and a control demodulator and decoder 1034. The control demodulator and decoder 1034 may demodulate and decode control signaling portions of the received signals (e.g. U-SIG fields and EHT-SIG fields of EHT basic PPDUs or EHT MU PPDUs, or U-SIG fields of EHT SU PPDUs). The data demodulator and decoder 1032 may demodulate and decode data portions of the received signals (e.g. data fields of ETH basic PPDUs, EHT SU PPDUs or EHT MU PPDUs) according to RU information and user-specific allocation information of its own allocations.

The at least one controller 1008 may include a control signal parser 1042, and a scheduler 1044 and a trigger information parser 1046. The control signal parser 1042 may analyse the control signaling portions of the received signals (e.g. U-SIG fields and EHT-SIG fields of EHT basic PPDUs or EHT MU PPDUs, or U-SIG fields of EHT SU PPDUs) and assist the data demodulator and decoder 1032 in demodulating and decoding the data portions of the received signals (e.g. data fields of EHT basic PPDUs, EHT SU PPDUs or EHT MU PPDUs). The triggering information parser 1048 may analyse the triggering information for its own uplink allocations from the received triggering frames contained in the data portions of the received signals. The transmission signal generator 1004 may include a control signaling generator 1024, which may generate control signaling fields of PPDUs to be generated (e.g. U-SIG fields of EHT basic PPDUs, EHT SU PPDUs or EHT TB PPDUs). The transmission signal generator 1004 may further include a PPDU generator 1026, which generate PPDUs (e.g. EHT basic PPDUs, EHT SU PPDUs or EHT TB PPDUs). The transmission signal generator 1004 may further include a frame generator 1022 may generate MAC frames, e.g. data frames.

As described above, the embodiments of the present disclosure provide an advanced communication system, communication methods and communication apparatuses for control signalling in MIMO WLAN networks of an extremely high throughput and improve spectral efficiency in MIMO WLAN networks.

The present disclosure can be realized by software, hardware, or software in cooperation with hardware. Each functional block used in the description of each embodiment described above can be partly or entirely realized by an LSI such as an integrated circuit, and each process described in each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas.

Some non-limiting examples of such a communication apparatus include a phone (e.g. cellular (cell) phone, smart phone), a tablet, a personal computer (PC) (e.g. laptop, desktop, netbook), a camera (e.g. digital still/video camera), a digital player (digital audio/video player), a wearable device (e.g. wearable camera, smart watch, tracking device), a game console, a digital book reader, a telehealth/telemedicine (remote health and medicine) device, and a vehicle providing communication functionality (e.g. automotive, airplane, ship), and various combinations thereof.

The communication apparatus is not limited to be portable or movable, and may also include any kind of apparatus, device or system being non-portable or stationary, such as a smart home device (e.g. an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

It will be understood that while some properties of the various embodiments have been described with reference to a device, corresponding properties also apply to the methods of various embodiments, and vice versa.

It will be appreciated by a person skilled in the art that numerous variations and/or modifications may be made to the present disclosure as shown in the specific embodiments without departing from the spirit or scope of the disclosure as broadly described. The present embodiments are, therefore, to be considered in all respects illustrative and not restrictive.

TABLE 13

An example format of Common field 1 of EHT-SIG field in EHT basic PPDU

| | Field size (bits) | | | | |
| --- | --- | --- | --- | --- | --- |
| Subfield name | BW = 0 to 4 | BW = 5 | BW = 6 | BW = 7 (option 1) | BW = 7 (option 2) |
| LDPC Extra Symbol Segment | 1 | 1 | 1 | 1 | 1 |
| Pre-FEC Padding Factor | 2 | 2 | 2 | 2 | 2 |
| PE Disambiguity | 1 | 1 | 1 | 1 | 1 |
| STBC | 1 | 1 | 1 | 1 | 1 |
| Doppler | 1 | 1 | 1 | 1 | 1 |
| GI-LTF Size | 2 | 2 | 2 | 2 | 2 |
| EHT-LTF Mode | 1 | 1 | 1 | 1 | 1 |
| Beam Change | 1 | 1 | 1 | 1 | 1 |
| Preamble Puncturing Bitmap | 0 | 3 | 7 | 15 | 7 |
| Total | 10 | 13 | 17 | 25 | 17 |

TABLE 14

An example format of Common field 2 when EHT basic PPDU is transmitted to multiple STAs

| | | Field size (bits) | | | |
|---|---|---|---|---|---|
| | | | EHT-SIG Compression = 0 | | |
| Subfield name | EHT-SIG Compression = 1 | BW = 20/ 40 MHz | BW = 80 MHz | BW = 160/ 80 + 80 MHz | BW = 320/ 160 + 160 MHz |
| RU Allocation | 0 | 9 | 18 | 36 | 72 |
| Center 26-Tone RU | 0 | 0 | 1 | 1 | 2 |
| Total | 0 | 9 | 19 | 37 | 74 |

TABLE 15

Summary of different EHT-SIG field formats in EHT basic PPDU depending on how it is encoded

| | | | Common field 1 | Common field 2 | User-Specific field |
|---|---|---|---|---|---|
| EHT basic PPDY with SU/MU Flag = 0 | Option 1 | | Separately encoded | X | Separately encoded |
| | Option 2 | | Jointly encoded with User-Specific field | X | Jointly encoded with Common field 1 |
| EHT basic PPDY with SU/MU Flag = 1 | EHT Compression = 1 | | Separately encoded | X | Separately encoded |
| | EHT Compression = 0 | Option 1 | Jointly encoded with Common field 2 | Jointly encoded with Common field 1 | Separately encoded |
| | | Option 2 | Separately encoded | Separately encoded | Separately encoded |

The invention claimed is:

1. A communication apparatus comprising:
circuitry, which, in operation, generates a transmission signal comprising a first signal field which comprises a first part and a second part, each comprising an equal number of data bits, wherein the data bits of the second part of the first signal field do not comprise version independent bits,
wherein the transmission signal comprises a second signal field which comprises part of version dependent bits in non-trigger-based communications; and
a transmitter, which, in operation, transmits the generated transmission signal.

2. The communication apparatus of claim 1, wherein the first signal field has a single format in non-trigger-based communications with one or more other communication apparatuses.

3. The communication apparatus of claim 1, wherein the second signal field has a format when the transmission signal is transmitted to one other communication apparatus and another format when the transmission signal is transmitted to more than one other communication apparatuses.

4. The communication apparatus of claim 1, wherein the second signal field comprises a preamble puncturing bitmap when the transmission signal is transmitted to one other communication apparatus.

5. The communication apparatus of claim 4, wherein the preamble puncturing bitmap has a variable bit width depending on the bandwidth of the transmission signal.

6. The communication apparatus of claim 1, wherein the first signal field comprises information for interpreting the second signal field.

7. A communication apparatus comprising:
a receiver, which, in operation, receives a transmission signal comprising a first signal field which comprises a first part and a second part, each comprising an equal number of data bits wherein the data bits of the second part of the first signal field do not comprise version independent bits,
wherein the transmission signal comprises a second signal field which comprises part of version dependent bits in non-trigger-based communications; and
circuitry, which, in operation, processes the received transmission signal.

8. The communication apparatus of claim 7, wherein the first signal field has a single format in non-trigger-based communications regardless of whether the transmission signal is received by the communication apparatus only or by the communication apparatus and one or more other communication apparatus.

9. The communication apparatus of claim 7, wherein the second signal field has a format when the transmission signal is received by the communication apparatus only and another format when the transmission signal is received by the communication apparatus and one or more other communication apparatus.

10. The communication apparatus of claim 7, wherein the second signal field comprises a preamble puncturing bitmap when the transmission signal is received by the communication apparatus only.

11. The communication apparatus of claim 10, wherein the preamble puncturing bitmap has a variable bit width depending on the bandwidth of the transmission signal.

12. The communication apparatus of claim 7, wherein the first signal field comprises information for interpreting the second signal field.

13. A communication method comprising:
generating a transmission signal comprising a first signal field which comprises a first part and a second part, each comprising an equal number of data bits, wherein the second part of the first signal field do not contain version independent bits,
wherein the transmission signal comprises a second signal field which comprises part of version dependent bits in non-trigger-based communications; and
transmitting the generated transmission signal.

* * * * *